(12) United States Patent
Kang

(10) Patent No.: US 9,876,869 B2
(45) Date of Patent: Jan. 23, 2018

(54) METHOD AND APPARATUS FOR PROVIDING BEACON SERVICE

(71) Applicant: SK Planet Co., Ltd., Gyeonggi-do (KR)

(72) Inventor: Kichon Kang, Seoul (KR)

(73) Assignee: SK PLANET CO., LTD., Seongnam-si, Gyeonggi-Do (KR)

( * ) Notice: Subject to any disclaimer, the term of this patent is extended or adjusted under 35 U.S.C. 154(b) by 0 days.

(21) Appl. No.: 15/286,140

(22) Filed: Oct. 5, 2016

(65) Prior Publication Data

US 2017/0126818 A1 May 4, 2017

(30) Foreign Application Priority Data

Oct. 28, 2015 (KR) .................. 10-2015-0149844
Oct. 30, 2015 (KR) .................. 10-2015-0151896
Oct. 30, 2015 (KR) .................. 10-2015-0152403

(51) Int. Cl.
| | | |
|---|---|---|
| H04L 29/08 | (2006.01) | |
| H04B 17/318 | (2015.01) | |
| H04W 4/02 | (2009.01) | |
| H04W 4/00 | (2009.01) | |
| G01C 21/36 | (2006.01) | |
| G01S 5/04 | (2006.01) | |
| G06Q 10/10 | (2012.01) | |

(52) U.S. Cl.
CPC .......... *H04L 67/18* (2013.01); *G01C 21/3676* (2013.01); *G01C 21/3697* (2013.01); *G01S 5/04* (2013.01); *G06Q 10/1093* (2013.01); *H04B 17/318* (2015.01); *H04L 67/26* (2013.01); *H04W 4/008* (2013.01); *H04W 4/028* (2013.01)

(58) Field of Classification Search
CPC ....... H04L 67/18; H04L 67/26; H04B 17/318; H04W 4/008; G01S 5/04
See application file for complete search history.

(56) References Cited

U.S. PATENT DOCUMENTS

2007/0264974 A1* 11/2007 Frank .................. H04L 63/0407
455/411
2012/0301117 A1* 11/2012 Alder ................. H04N 5/44543
386/293

(Continued)

*Primary Examiner* — Moustapha Diaby
(74) *Attorney, Agent, or Firm* — Fenwick & West LLP

(57) ABSTRACT

A user's terminal device and a service management server can provide specific service content associated with a registered beacon service to a user. In an embodiment, the terminal device registers at least one beacon service at a user's request and sends information about the registered beacon service to the service management server. Then the terminal device receives first beacon identification information corresponding to the registered beacon service from the service management server and stores the first beacon identification information. Further, when a beacon signal containing second beacon identification information is received from a beacon device, the terminal device compares the second beacon identification information with the first beacon identification information. If both of identification information are identical with each other, the terminal device offers service content corresponding to the second identification information.

8 Claims, 21 Drawing Sheets

(56) References Cited

U.S. PATENT DOCUMENTS

| | | | |
|---|---|---|---|
| 2013/0311868 A1* | 11/2013 | Monney | G06F 17/30017 715/230 |
| 2014/0204000 A1* | 7/2014 | Sato | H04W 64/00 345/2.3 |
| 2015/0018011 A1* | 1/2015 | Mendelson | G01C 21/206 455/456.3 |
| 2015/0294084 A1* | 10/2015 | McCauley | G06F 19/3456 705/2 |
| 2015/0304341 A1* | 10/2015 | Son | H04L 63/107 726/4 |
| 2015/0348146 A1* | 12/2015 | Shanmugam | G06Q 30/0603 705/71 |
| 2016/0100282 A1* | 4/2016 | Pounds | H04W 4/008 455/456.1 |

\* cited by examiner

METHOD AND APPARATUS FOR PROVIDING BEACON SERVICE

TECHNICAL FIELD

The present invention relates generally to beacon-based technologies and, more particularly, to a beacon service provision method and apparatus capable of offering specific service content associated with a registered beacon service to a user.

BACKGROUND

Details disclosed in this section merely offers background information regarding embodiments of the present invention. No determination has been made, and no assertion is made, as to whether any of the below might be applicable as prior art with regard to the present invention.

With the remarkable development of a mobile communication network and related technologies, today's mobile communication devices have outgrown a typical category of simple communication devices or information providing devices and are now evolving into total entertainment devices.

Such a mobile communication device often has a function of short range communication such as NFC (Near Field Communication) or Bluetooth as well as a traditional communication function using a mobile communication network.

By the way, NFC covers a relatively narrower communication range and needs an additional wireless chip, whereas Bluetooth covers a relatively wider communication range and is inherently applied to most of recent mobile communication devices. In addition, a great variety of communication services using Bluetooth are developed and launched.

Meanwhile, a new service for offering various kinds of information to a user's mobile device by utilizing a beacon based on Bluetooth communication is being developed and studied.

For example, a beacon-based content provision service is used. This service is based on a beacon device installed in a store. The beacon device emits a periodic signal by using an electromagnetic wave or sound and thereby triggers a specific application of a neighboring mobile communication device. Using this service, content providers may provide a great variety of contents associated with publicity, advertisement, finance, banking, payment, game, and the like.

However, in this beacon-based service, a user's terminal device (i.e., a mobile communication device) offers particular service contents corresponding to a beacon signal to a user regardless of user's intention whenever recognizing the beacon signal. Namely, undesired notifications regarding a beacon service are frequently offered to a user by means of a push message, and this may often draw a user's unwelcome attention to a beacon service.

In order to obviate such inconvenience, a user can enter a setting menu or page of an application for providing a beacon service and then set the beacon service unavailable. However, in this case, a user will not receive any content, even desired content, any more.

Accordingly, required is a technique to selectively provide only user's desired content in a beacon service when a user's terminal device detects a beacon signal.

SUMMARY

In order to address the aforesaid or any other issue, the present invention provides a method in which a user's terminal device registers a beacon service and transmits information about the registered beacon service to a service management server, in which the service management server extracts first beacon identification information corresponding to the registered beacon service and sends the extracted information to the terminal device, and in which the terminal device receives a beacon signal containing second beacon identification information from a beacon device, and if the second beacon identification information is identical with the first beacon identification information, provides specific service content corresponding to the second identification information to a user.

Additionally, the present invention provides another method in which the service management server finds a specific place corresponding to the registered beacon service around the terminal device, calculates a distance and direction from a current location of the terminal device to the specific place, and offers a calculation result to the terminal device such that a user of the terminal device can use a desired beacon service conveniently.

Also, the present invention provides still another method for managing a user's schedule based on the registered beacon service.

The present invention is not limited to the above object, and any other object, even though not mentioned herein, may be well understood from the following description.

According to an embodiment of the present invention, a beacon service provision method implemented by a terminal device may include steps of registering at least one beacon service at a user's request; receiving, from a service management server, first beacon identification information corresponding to the registered beacon service; storing the first beacon identification information; receiving, from a beacon device, a beacon signal containing second beacon identification information; comparing the second beacon identification information with the first beacon identification information; and if the second beacon identification information is identical with the first beacon identification information, offering service content corresponding to the second identification information.

In this method, the storing step may include further storing service content corresponding to the first beacon identification information, and the offering step may include offering the stored service content.

Additionally, in this method, the offering step may include steps of transmitting the second beacon identification information to the service management server; receiving, from the service management server, the service content corresponding to the second beacon identification information; and outputting the received service content.

Additionally, this method may further include steps of checking a length of stay at a specific place corresponding to the second beacon identification information by using strength of the received beacon signal; and offering service content according to the length of stay.

Additionally, this method may further include steps of determining whether at least one store corresponding to the first beacon identification information is located within a predetermined range; if there is at least one store within the predetermined range, calculating a direction and distance to the at least one store from a location corresponding to the second beacon identification information; and offering the calculated direction and distance.

Additionally, this method may further include steps of, if the registered beacon service is a scheduler service, transmitting, to the service management server, schedule information including the first beacon identification information;

and receiving, from the service management server, rescheduling information created based on the schedule information.

According to another embodiment of the present invention, a beacon service provision method implemented by a service management server may include steps of registering first beacon identification information at a user's request; receiving, from a terminal device, second beacon identification information offered by a beacon device; comparing the second beacon identification information with the first beacon identification information; and if the second beacon identification information is identical with the first beacon identification information, transmitting, to the terminal device, one of service content corresponding to the second identification information and rescheduling information created from a user's schedule in view of predetermined event information.

This method may further include steps of checking a length of stay of the terminal device at a specific place corresponding to the second beacon identification information; and transmitting service content according to the length of stay to the terminal device.

Additionally, this method may further include steps of determining a current location of the terminal device by using triangulation based on the second beacon identification information; and calculating a direction and distance to at least one store from the determined current location.

Additionally, this method may further include steps of extracting at least one store corresponding to the first beacon identification information and located within a predetermined range from the terminal device; calculating a direction and distance to the at least one store from a location corresponding to the second beacon identification information; and offering the calculated direction and distance.

Additionally, in this method, the transmitting step may include step of transmitting a direction and distance to a specific store for offering specific service content having the highest priority selected from among service contents corresponding to the first beacon identification information.

Additionally, in this method, the transmitting step may include step of transmitting a direction and distance to a specific store having the nearest location from the terminal device.

Additionally, in this method, if a beacon service corresponding to the first beacon identification information is a scheduler service, the step of registering the first beacon identification information may include steps of receiving schedule information from the terminal device; identifying a current location and destination of the terminal device, based on the received schedule information; establishing a travel path from the current location to the destination, based on the received schedule information; extracting at least one beacon device located on the travel path; and registering the first beacon identification information of the extracted at least one beacon device.

Additionally, in this method, the step of registering the first beacon identification information may further include steps of checking predetermined event information corresponding to the extracted beacon device; extracting a first beacon device based on the event information; determining whether there is other beacon device being similar with the first beacon device within a predetermined range from the first beacon device; if there is the similar beacon device, selecting a second beacon device from among the similar beacon devices in view of event information; and creating rescheduling information by resetting the travel path to pass the selected second beacon device.

Additionally, in this method, the step of registering the first beacon identification information may further include step of, in case of failing to extract the first beacon device based on the event information, extracting the first beacon device in view of user information of the terminal device.

Additionally, in this method, the user information may include information about a payment method, a purchase history, favorites, or a customer point.

Additionally, in this method, the transmitting step may include step of transmitting a push notification message to the terminal device or reestablishing the rescheduling information, based on a result of comparison between the second beacon identification information received from the terminal device and the first beacon identification information contained in the rescheduling information.

According to still another embodiment of the present invention, a service management server may include a communication module configured to transmit or receive data to or from a terminal device through a communication network; and a control module configured to receive information about at least one beacon service registered in the terminal device through the communication module, to extract first beacon identification information corresponding to the beacon service, to receive second beacon identification information from the terminal device through the communication module, and to transmit, if the second beacon identification information is identical with the first beacon identification information, service content corresponding to the second identification information to the terminal device through the communication module.

In the service management server, the control module may be further configured to determine, based on the second beacon identification information, whether there is a specific place corresponding to the extracted first beacon identification information within a predetermined range, and to calculate a direction and distance from the terminal device to the specific place corresponding to the extracted first beacon identification information.

Also, in the service management server, if the registered beacon service is a scheduler service, the control module may be further configured to receive schedule information from the terminal device through the communication module, to extract at least one beacon device based on the received schedule information, to create rescheduling information by resetting the received schedule information in view of event information of the extracted at least one beacon device, and to transmit the rescheduling information to the terminal device through the communication module.

According to this invention, the terminal device can provide user's desired service content only by receiving, from the service management server, the first beacon identification information corresponding to the registered beacon service and then offering specific content service only when the second beacon identification information contained in a received beacon signal is identical with the received first beacon identification information.

This may prevent service contents from being provided unconditionally to a user regardless of user's intention.

Further, according to this invention, the service management server can offer, to a user, information about a specific place corresponding to the registered beacon service around the terminal device and information about a distance and direction from a current location of the terminal device to the specific place, thus allowing the user to use a desired beacon service conveniently.

Still further, according to this invention, the service management server can offer, to a user, information optimally rescheduled in view of a user's current location, a user's schedule, event information of stores, geographical locations of such stores, and the like.

Other various advantages and effects will be disclosed explicitly or implicitly in embodiments of this invention to be described below in detail.

DETAILED DESCRIPTION

Figure 1:
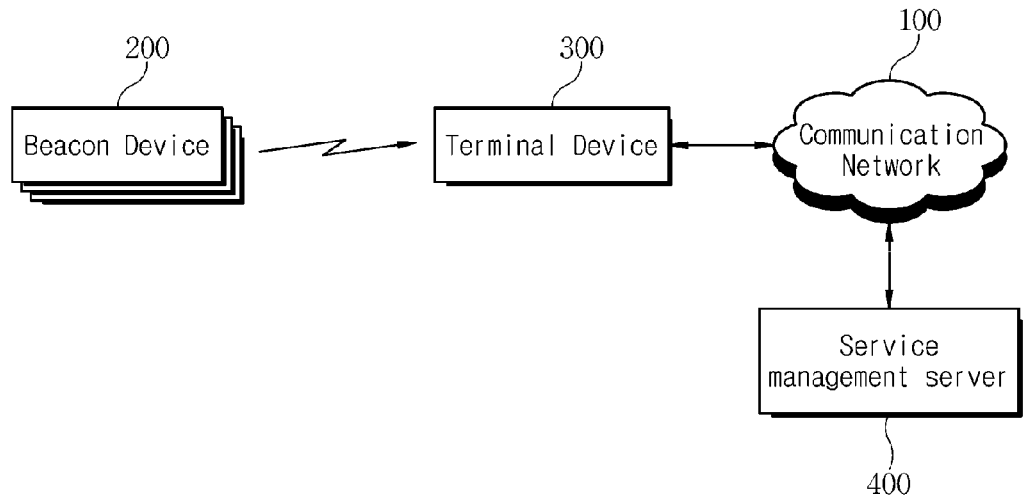
FIG. 1 is a diagram illustrating a system for providing a beacon service according to an embodiment of the present invention.

Now, embodiments of the present invention will be described with reference to the accompanying drawings.

In the following description and the accompanying drawings, however, well known techniques may not be described or illustrated in detail to avoid obscuring the subject matter of the present invention. Through the drawings, the same or similar reference numerals denote corresponding features consistently.

The terms and words used in the following description, drawings and claims are not limited to the bibliographical meanings and are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

The expression "1", "2", "first", or "second" used in various embodiments of this disclosure may modify various elements of such embodiments but does not limit the corresponding elements. The above expressions do not limit the sequence and/or importance of the elements but may be used for distinguishing one element from other elements. For example, a first device and a second device indicate different devices although both of them are devices. Meanwhile, without departing from the scope of the present disclosure, a first structural element may be referred to as a second structural element. Similarly, the second structural element also may be referred to as the first structural element.

When it is stated that a certain element is "coupled to" or "connected to" another element, the element may be directly coupled or connected to another element, or a new element may exist between both elements. In contrast, when it is stated that a certain element is "directly coupled to" or "directly connected to" another element, a new element does not exist between both elements.

The terms used in describing various embodiments of this disclosure are only examples for describing a specific embodiment but do not limit such embodiments. Singular forms are intended to include plural forms unless the context clearly indicates otherwise. Unless defined differently, all terms used herein, which include technical terminologies or scientific terminologies, have the same meaning as that understood by a person skilled in the art to which the present disclosure belongs. The terms "include", "comprise", and "have" as well as derivatives thereof, mean inclusion without limitation.

Embodiments within the scope of the present invention include computer-readable media for carrying or having computer-executable instructions or data structures stored thereon. Such computer-readable media may be any available media, which is accessible by a general-purpose or special-purpose computer system.

By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as one or more data links (of possibly different speeds) that enable the transport of electronic data between computer systems and/or modules (e.g., hardware and/or software modules). When information is transferred or provided over a network or another communications connection (either hardwired, wireless, or a combination of hardwired or wireless) to a computer system, the connection is properly viewed as a computer-readable medium. Computer-executable instructions include, for example, instructions and data which cause a general-purpose computer system or special-purpose computer system to perform a certain function or group of functions. The computer executable instructions may be, for example, binaries, intermediate format instructions such as assembly language, or even source code.

Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

Hereinafter, a service using beacon technology according to this invention will be described on the basis of data communication technology using Bluetooth low energy (BLE) technique.

While near field communication (NFC) technique is available only within several centimeters, Bluetooth technique is available within the range of several meters and is thus widely utilized in various fields. Further, unlike NFC, Bluetooth technique requires no tagging onto a reader and allows the delivery of data in response to a mere approach or passage to or through a beacon device. In addition, Bluetooth technique is helpful in reading indoor locations and delivering customized data.

This invention is, however, not limited to Bluetooth or BLE only and may further or alternatively employ any other short range communication technique, based on a personal area network (PAN), such as Zigbee, ultra wideband (UWB), ANT, Wi-Fi, NFC, or the like.

In this disclosure, the term 'first beacon identification information' refers to beacon identification information extracted by a service management server with regard to a specific beacon service registered in a terminal device. Additionally, the term 'second beacon identification information' refers to beacon identification information contained in a beacon signal emitted by a beacon device and received by a terminal device.

Now, several apparatuses for providing a beacon service in a beacon service system according to an embodiment of the present invention will be described with reference to the accompanying drawings.

At the outset, a system for providing a beacon service according to an embodiment of the present invention will be described in detail.

FIG. 1 is a diagram illustrating a system for providing a beacon service according to an embodiment of the present invention.

Referring to FIG. 1, the beacon service provision system may include a communication network 100, one or more beacon devices 200, a terminal device 300, and a service management server 400.

Although the terminal device 300 transmits or receives data to or from the beacon devices 200 through BLE communication technique, this is exemplary only and not to be construed as a limitation. As mentioned above, any other short range communication technique may be alternatively applied.

The terminal device 300 is connected to and interworks with the service management server 400 through the communication network 100.

Hereinafter, each element will be described in detail with reference to FIG. 1.

The communication network 100 performs a function to deliver data for transmission and reception of data between the terminal device 300 and the service management server 400. The communication network 100 may use wireless communication technique such as, but not limited to, WLAN (Wireless Local Access Network), Wi-Fi, Wibro, Wimax, HSDPA (High Speed Downlink Packet Access), LTE (Long Term Evolution), LTE-A (LTE-Advanced), or the like. Alternatively or additionally, depending on system types, the communication network 100 may use wired communication technique such as Ethernet, xDSL (ADSL, VDSL), HFC (Hybrid Fiber Coaxial cable), FTTC (Fiber To The Curb), FTTH (Fiber To The Home), or the like.

Additionally, the communication network 100 includes a plurality of access networks (not shown) and a core network (not shown), and may further include an external network, e.g., Internet (not shown). Here, the access network is to perform wired/wireless communication with the terminal device 300 and may be formed of a plurality of base stations, also referred to as BTS (Base Transceiver Station), NodeB, or eNB (eNodeB or evolved Node B), and controllers such as BSC (Base Station Controller) and RNC (Radio Network Controller). Additionally, instead of such a base station that includes a digital signal processor and a radio signal processor, a plurality of radio units (not shown) corresponding to the radio signal processor may be disposed respectively at a plurality of regions and connected to a centralized digital unit (not shown) corresponding to the digital signal processor.

The core network which forms a mobile network together with the access network performs a function to connect the access network and the external network such as Internet.

The core network is a network system that performs main functions for a mobile communication service such as mobility control and switching between the access networks. Namely, the core network performs circuit switching or packet switching and further manages and controls a packet flow in the mobile network.

In addition, the core network may manage mobility between frequencies, control traffic therein and in the access network, and control interworking with other network such as Internet. The core network may be formed of SGW (Serving GateWay), PGW (PDN GateWay), MSC (Mobile Switching Center), HLR (Home Location Register), MME (Mobile Mobility Entity), HSS (Home Subscriber Server), and/or the like.

The Internet is a world common network through which information is exchanged according to TCP/IP protocol. The Internet is connected to the terminal device 300 and may deliver information, offered from the terminal device 300, to the service management server 400 through the core network and the access network. Similarly, the Internet may deliver information, offered from the service management server 400, to the terminal device 300 through the core network and the access network. This is, however, exemplary only and not to be construed as a limitation. Alternatively, the service management server 400 may be integrated with the core network.

In addition to the above-discussed communication technique, any other communication technique well known in the art or to be developed may be used for this invention.

The beacon device 200 refers to an apparatus that periodically emits a beacon signal for a typical beacon service. This beacon signal may contain beacon identification information, such as device information or location information, allocated to the beacon device 200. Such beacon identification information is the basis used for the terminal device 300 to be offered a beacon service.

The beacon device 200 performs a function to emit a beacon signal through short range communication and to offer a particular service to the terminal device 300 connected by means of beacon scanning. The beacon device 200 may emit a beacon signal according to a BLE (Bluetooth Low Energy) communication protocol. Emitting a beacon signal within a certain range from 5 cm to 49 m, the beacon device 200 may be installed at indoor places such as a store. The beacon device 200 has a firmware program for processing and managing information about services (e.g., an advertisement, a location based service, etc.). This firmware program has essential information required for operating the beacon device 200 and may be managed and updated by the service management server 400.

Additionally, the beacon device 200 may be classified into a master beacon and a slave beacon. The master beacon has both a communication module for emitting a beacon signal to the terminal device 300 located within specific service coverage and a communication module for connecting to the service management server 400. The slave beacon emits a beacon signal within specific service coverage and is capable of being connected to the master beacon. For access to the service management server 400, the slave beacon may be connected under the control of the master beacon. Depending on system circumstances or requests, the master beacon for connection may be changed. Meanwhile, the master beacon may be connected to the communication network 100 through an access point device (not shown) and transmit or receive information to or from the service management server 400 through the communication network 100.

The terminal device 300 refers to a user's device capable of transmitting and receiving various data through the communication network 100 in response to user's manipulations. The terminal device 300 may perform voice or data communication through the communication network 100, transmit or receive information to or from the service management server 400 through the communication network 100, and receive information from the beacon device 200 by means of beacon-based communication. For this, the terminal device 300 may have a memory for storing programs and protocols for transmitting, receiving and processing a beacon signal, a microprocessor for executing and controlling various programs, and the like.

The terminal device 300 may perform the access to any application provider (not shown) such as App Store on the communication network 100, receive a beacon service application from the application provider, and install the beacon service application for receiving a beacon signal and showing content corresponding to the beacon signal. The terminal device 300 may execute the beacon service application, extract beacon identification information from the beacon signal, transmit the extracted information to the service management server 400, receive specific content (e.g., a discount coupon, a membership card benefit, etc.) mapped to the beacon identification information from the service management server 400, and offer the received content to a user.

Particularly, according to an embodiment of this invention, when one or more beacon services are registered in response to a user's request, the terminal device 300 transmits information about the registered beacon services to the service management server 400. Then the terminal device 300 receives first beacon identification information associated with the registered beacon services from the service management server 400 and stores the received information.

In this case, the terminal device 300 may receive and store service content, together with the first beacon identification information, corresponding to the first beacon identification information from the service management server 400. Also, the first beacon identification information and corresponding service contents may be received sequentially depending on locations of the terminal device 300.

The location of the terminal device 300 may be measured using a GPS sensor. Additionally or alternatively, the location of the terminal device 300 may be measured by means of triangulation using the beacon devices 200, base stations and/or AP devices which are adjacent to the terminal device 300.

The reason of sequential reception is as follows. If the first beacon identification information and corresponding service contents offered to the terminal device 300 by the service management server 400 are too much, this may cause a shortage of memory in the terminal device 300. It is desirable to receive sequentially such information and contents according to locations of the terminal device 300.

For example, if the terminal device 300 is currently located in 'Region A', the service management server 400 transmits, to the terminal device 300, the first beacon identification information and service contents only available for 'Region A'. Namely, in 'Region A', the terminal device 300 needs not receive any information and contents available for other regions.

In this case, a regional scope for sequential reception may be adjusted on the basis of administrative districts. Instead, a certain physical range may be used for such sequential reception.

After the first beacon identification information and service content are received from the service management server 400, the terminal device 300 may receive the second beacon identification information from the beacon device 200. Then the terminal device 300 may compare the received second beacon identification information with the stored first beacon identification information. If the received identification information is identical with the stored identification information, the terminal device 300 may offer, to a user, specific service content corresponding to the second beacon identification information.

In this case, if such service content, together with the first beacon identification information, has been already received from the service management server 400 and stored in the terminal device 300, the terminal device 300 may offer the stored service content to a user. If the first beacon identification information only has been received and stored, the terminal device 300 may transmit the second beacon identification information to the service management server 400 and then receive corresponding service content from the service management server 400.

Additionally, the terminal device 300 may check a length of stay at a specific place corresponding to the second beacon identification information and then offer specific service content depending on the checked length of stay. This length of stay may be calculated on the basis of the number of continuously receiving the second beacon identification information at signal strength greater than predetermined received signal strength.

Namely, if a beacon signal is received at signal strength greater than predetermined received signal strength, it is determined that the terminal device 300 enters a place (e.g., a store) corresponding to the beacon device 200 that emits the received beacon signal. Since the beacon device 200 emits periodically a beacon signal, the length of stay of the terminal device 30 may be obtained from the number of continuously received signals.

When the length of stay is longer, service content offered to the terminal device 300 may have a higher-level benefit. This may arouse a great interest of a user having the terminal device 300.

Meanwhile, according to another embodiment of this invention, when a beacon service is registered in response to a user's request, the terminal device 300 transmits information about the registered beacon service to the service management server 400.

Thereafter, when a beacon signal is received from the beacon device 200, the terminal device 300 transmits second beacon identification information contained in the received beacon signal to the service management server 400 and then may receive specific service content corresponding to the second beacon identification information.

For example, in case a beacon service to be registered is a scheduler service, the terminal device 300 transmits schedule information to the service management server 400 through the communication network 100. The schedule information may be things to do, places to visit, etc. on a day-to-day basis. In this case, the terminal device 300 may create user's schedule information based on a specific period, e.g., day, by interworking with a scheduler program, and deliver the created schedule information to the service management server 400. For example, if a user enters a future plan, appointment or event, e.g., 'Dec. 24, 7:00 p.m., Restaurant AA' through the scheduler program, the terminal device 300 may create schedule information having the entered plan, appointment or event at the corresponding date and then transmit the created schedule information to the service management server 400. This is, however, exemplary only. Alternatively, schedule information may be transmitted to the service management server 400 as soon as a user enters such information. Thereafter, the terminal device 300 may receive, from the service management server 400, rescheduling information created using the schedule information by the service management server 400.

The terminal device 300 may be implemented in various forms. For example, the terminal device 300 disclosed herein may be a mobile device such as a smart phone, a tablet PC, a PDA (Personal Digital Assistant), a PMP (Portable Multimedia Player), an MP3 player, and the like, or a stationary device such as a smart TV, a desktop computer, and the like.

Additionally, according to a recent trend of convergence in digital devices, a great variety of mobile devices or their equivalences may be used as the terminal device 300 in the present invention. Furthermore, any device that allows a beacon service application to be downloaded and installed may be used as the terminal device 300 in embodiments of this invention.

The service management server 400 may manage a plurality of beacon devices 200, receive a service request from the terminal device 300, and provide information corresponding to the requested service.

Particularly, when information about a beacon service registered in the terminal device 300 is received from the terminal device 300, the service management server 400 may extract the first beacon identification information associated with the received beacon service information, i.e., indicating a store available for the registered beacon service, together with corresponding service content.

Then the service management server 400 may transmit the extracted first beacon identification information to the terminal device 300 together with the extracted service content.

If the first beacon identification information only is transmitted to the terminal device 300, the service management server 400 may receive the second beacon identification information from the terminal device 300 and then transmit the service content corresponding to the second beacon identification information to the terminal device 300.

Additionally, the service management server 400 may sequentially extract the first beacon identification information and service contents depending on locations of the terminal device 300. In this case, the service management server 400 may extract all kinds of the first beacon identification information and service contents associated with the registered beacon service and then transmit sequentially them depending on locations of the terminal device 300.

Meanwhile, when information about one or more beacon services registered in the terminal device 300 is received from the terminal device 300, the service management server 400 extracts and stores one or more kinds of the first beacon identification information associated with the received beacon service information.

In this case, the extracted first beacon identification information may be stored after being mapped to particular beacon service information corresponding to the first beacon identification information or mapped to the terminal device 300 that transmits the beacon service information corresponding to the first beacon identification information. Also, it is possible to map all of the first beacon identification information, the beacon service information, and information about the terminal device 300.

Additionally, the service management server 400 may extract sequentially the first beacon identification information depending on locations of the terminal device 300.

Thereafter, when the second beacon identification information is received from the terminal device 300, the service management server 400 compares the received second beacon identification information with the stored first beacon identification information. If the received identification information is identical with the stored identification information, the service management server 400 transmits, to the terminal device 300, specific service content corresponding to the second beacon identification information.

In this case, the service management server 400 may check a length of stay of the terminal device 300 at a specific place corresponding to the second beacon identification information and then, depending on the checked length of stay, offer specific service content to the terminal device 300.

This length of stay may be calculated on the basis of the number of continuously receiving the second beacon identification information at signal strength greater than predetermined received signal strength. Namely, if received signal strength is greater than a predetermined value, it is determined that the terminal device 300 enters a particular place (e.g., a store). Since the beacon device 200 emits periodically a beacon signal, the length of stay of the terminal device 30 may be obtained from the number of continuously received signals.

A longer length of stay of the terminal device 300 at a particular store means a stronger possibility of a purchase at that store. Therefore, in case of such a longer length of stay, the service management server 400 may offer service content having a higher-level benefit to the terminal device 300 and thereby arouse a great interest of a user having the terminal device 300.

Meanwhile, when user's schedule information is received from the terminal device 300, the service management server 400 creates a travel path based on the schedule information. Then the service management server 400 may find the beacon device 200 located on the travel path, identify event information associated with the beacon device 200, redefine the travel path in view of the identified event information, create rescheduling information based on the redefined travel path, and then transmit the rescheduling information to the terminal device 300.

In view of hardware, the service management server 400 according to an embodiment of this invention has the same configuration as a typical web server or network server. However, in view of software, the service management server 400 includes a program module having codes written in computer languages such as C, C++, Java, Visual Basic, Visual C, and the like.

Meanwhile, a memory unit equipped in each apparatus disclosed herein is configured to store information in such an apparatus. In various embodiments, the memory unit is a computer-readable storage medium. In one embodiment, the memory unit may be a volatile memory unit. In another embodiment, the memory unit may be a nonvolatile memory unit. In some embodiments, the memory unit or storage unit may be a hard disk, an optical disk, and/or any other mass storage device.

In addition, the term "module" used herein may refer to a component or device which is formed of software, hardware, or combination thereof, and performs certain tasks. A module may be configured to reside on an addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Although this description and drawings illustrate exemplary device elements, the subject matters and functional operations disclosed herein may be implemented by different type digital electronic circuits or implemented by computer software, firmware or hardware including a structure disclosed herein and structural equivalent thereof, or any combination thereof. The subject matters disclosed herein may be implemented by at least one computer program product, namely at least one module regarding computer program commands encoded on a program storage medium so as to control the operation of a device according to this invention or allow execution thereby. A computer-readable medium may be a machine-readable storage device, a machine-readable storage board, a memory device, a machine-readable composition of material affecting wave-type signaling, or a combination thereof.

Heretofore, the beacon service provision system according to an embodiment of the present invention is fully described.

Now, the terminal device 300 included in the above-discussed system will be described in more detail.

Figure 2:
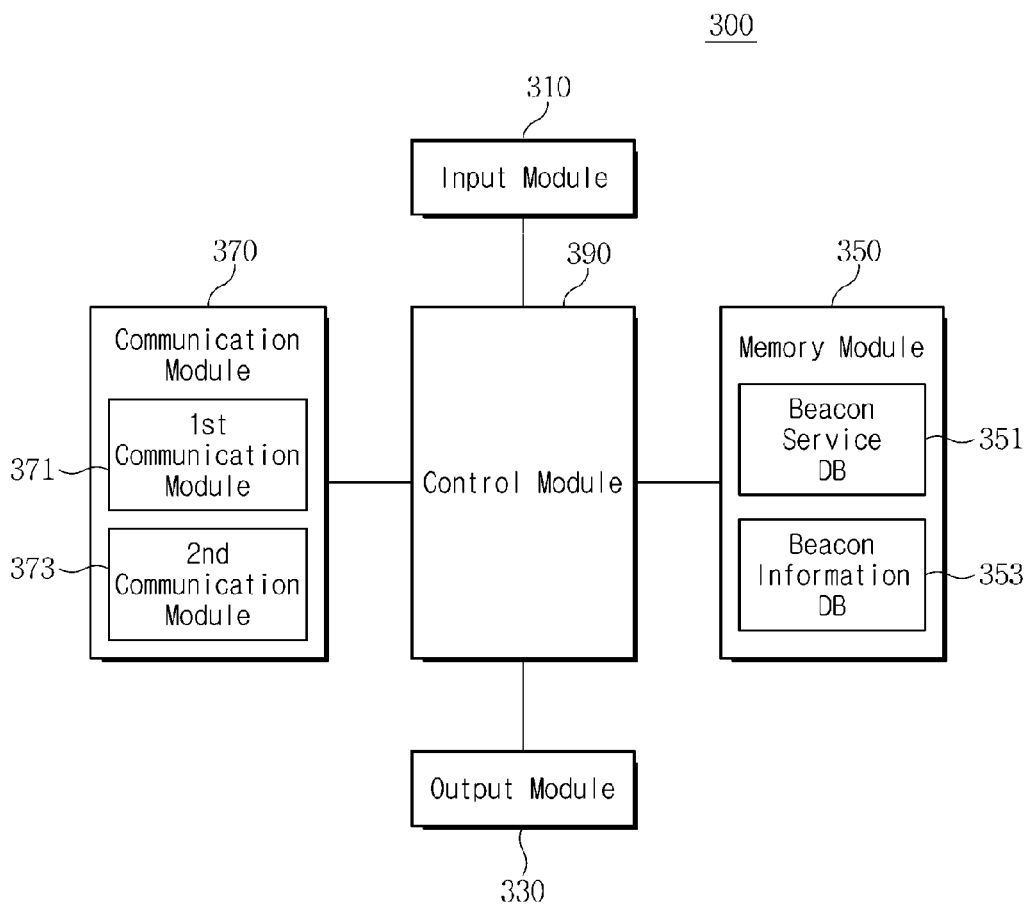
FIG. 2 is a block diagram illustrating a terminal device according to an embodiment of the present invention.
Figure 3:
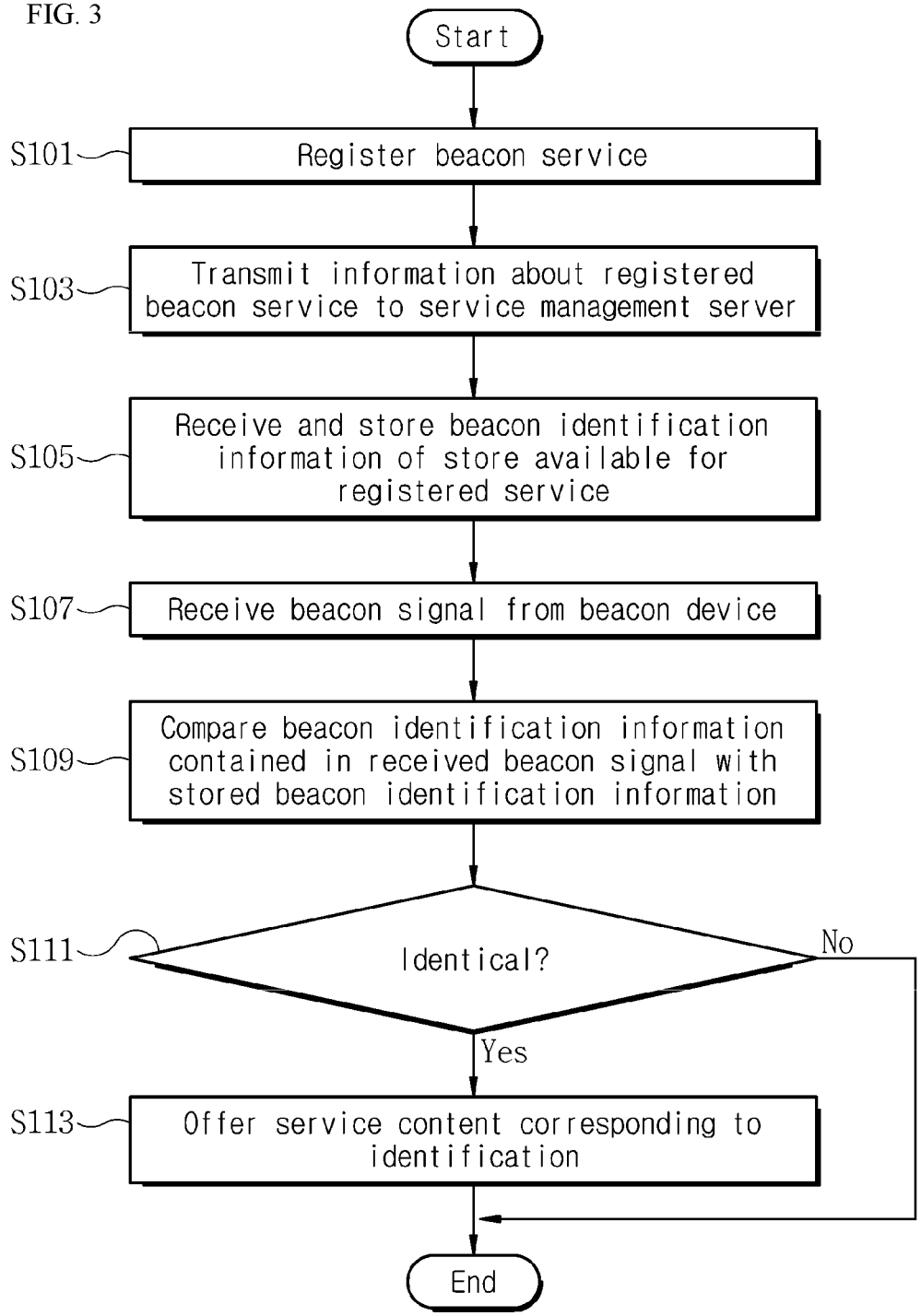
FIGS. 3 and 4 are flow diagrams illustrating an operating process of a terminal device according to an embodiment of the present invention.
Figure 4:
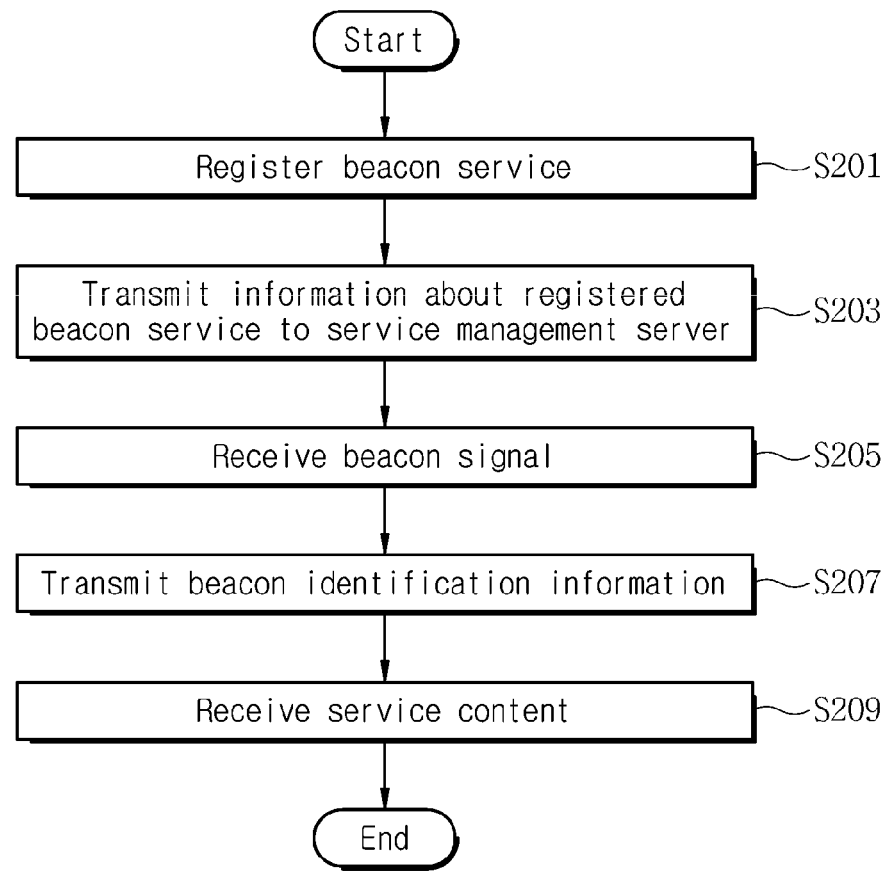

FIG. 2 is a block diagram illustrating a terminal device according to an embodiment of the present invention. FIGS. 3 and 4 are flow diagrams illustrating an operating process of a terminal device according to an embodiment of the present invention.

Referring to FIG. 2, the terminal device 300 may include an input module 310, an output module 330, a memory module 350, a communication module 370, and a control module 390.

The input module 310 is configured to receive user's manipulation for entering various kinds of information and setting or controlling various functions of the terminal device 300, to create a corresponding input signal, and to deliver the input signal to the control module 390. The input module 310 may include a keypad and/or a touch pad. The input module 310 formed of a touch panel may be integrated with the output module 330 formed of a display panel to constitute a touch screen. The input module 310 may use various input mechanisms such as a keyboard, a mouse, a joystick, a jog wheel, a touch-sensitive unit, a gesture or image detection unit, a voice recognition unit, and the like. Additionally, the input module 310 detects input information entered by the user and delivers it to the control module 390.

Particularly, the terminal device 300 may receive a user's input or request for registering a beacon service through the input module 310. Namely, a user can register a desired beacon service in the terminal device 300 through the input module 310.

The output module 330 is configured to display information about the state and result of operations generated during the execution of functions of the terminal device 300. Also, the output module 330 may display a menu of the terminal device 300 and user data entered by the user. The output module 330 may be formed of LCD (Liquid Crystal Display), TFT-LCD (Thin Film Transistor LCD), LED (Light Emitting Diode), OLED (Organic LED), AMOLED (Active Matrix OLED), retina display, flexible display, 3-dimensional display, or the like. In case the output module 330 is formed of a touch screen, the output module 330 may perform the whole or parts of functions of the input module 310.

Particularly, the terminal device 300 may offer particular service content, received from the service management server 400, to a user through the output module 330.

The memory module 350 is a device for storing data and includes a main memory unit and an auxiliary memory unit. Further, the memory module 350 stores a program required for the operation of the terminal device 300. The memory module 350 may include mainly a program region and a data region. When any function is activated in response to a user's request, the terminal device 300 executes a relevant application and offers a particular function under the control of the control module 390.

Particularly, the memory module 350 may have a beacon service database (DB) 351 that records a beacon service registered by a user's request. Also, the memory module 350 may have a beacon information database 353 that records the first beacon identification information and service contents received from the service management server 400.

The communication module 370 is configured to transmit or receive data to or from the service management server 400 through the communication network 100.

The communication module 370 may include an RF transmitter which up-converts the frequency of an outgoing signal and then amplifies the signal, an RF receiver which amplifies with low-noise an incoming signal and down-converts the frequency of the signal, a data processor for processing a communication protocol based on a specific communication scheme, and the like. The communication module 370 may include at least one wireless communication module (not shown) and/or at least one wired communication module (not shown). The wireless communication module may be configured for transmission and reception based on a particular wireless communication scheme. In case of using wireless communication, the terminal device 300 may transmit or receive data to or from the service management server 400 by using one of a wireless network communication module, a WLAN communication module, and a WPAN communication module.

The communication module 370 includes the first communication module 371 and the second communication module 373.

The first communication module 371 receives a signal transmitted from the beacon device 200. The first communication module 371 may perform PAN-type communication including Bluetooth.

The second communication module 373 communicates with the service management server 400 through the communication network 100. The second communication module 373 may use wireless communication technique such as, but not limited to, WLAN (Wireless Local Access Network), Wi-Fi, Wibro, Wimax, HSDPA (High Speed Downlink Packet Access), or the like.

The control module 390 may be a processor for triggering and operating each element and an operation system of the terminal device 300.

For example, the control module 390 may control the communication module 370 to transmit a signal entered through the input module 310 to the service management server 400, may control the output module 330 to output a beacon signal received through the communication module 370 or to output information received from the service management server 400, and may control the memory module 350 to store such information and/or data.

Particularly, the control module 390 controls the overall operating process of the terminal device 300 according to embodiments of the present invention. Details are described hereinafter with reference to FIG. 3.

The control module 390 registers one or more beacon services in response to a user's request (step S101), and transmits information about the registered beacon services to the service management server 400 (step S103). Then the control module 390 receives first beacon identification information associated with the registered beacon services from the service management server 400 and stores the received information in the memory module 350 (step S105).

In this case, the control module 390 may further receive and store service content corresponding to the first beacon identification information from the service management server 400. Also, the first beacon identification information and corresponding service contents may be received sequentially depending on locations of the terminal device 300.

As discussed above, such sequential reception is intended to obviate a shortage of memory in the terminal device 300.

Thereafter, the control module 390 receives a beacon signal from the beacon device 200 through the first communication module 371 and extracts the second beacon identification information from the received beacon signal (step S107). Then the control module 390 compares the extracted second beacon identification information with the stored first beacon identification information (step S109) and determines whether both are identical with each other (step S111). If the second identification information is identical with the first identification information, the control module 390 offers specific service content corresponding to the second beacon identification information to a user through the output module 330 (step S113).

In this case, if such service content has been already received and stored together with the first beacon identification information, the terminal device 300 may retrieve the stored service content from the memory module 350 and offer it to a user. If any service content has been not yet received, the terminal device 300 may transmit the second beacon identification information to the service management server 400, receive corresponding service content from the service management server 400, and offer the received service content to a user.

If both kinds of identification information are not identical with each other, the terminal device 300 does not offer service content to a user. Namely, in this case, the terminal device 300 may not perform any particular operation.

Additionally, the terminal device 300 may check a length of stay at a specific place corresponding to the second beacon identification information and then offer specific service content depending on the checked length of stay.

This length of stay may be calculated on the basis of the number of continuously receiving the second beacon identification information at signal strength greater than predetermined received signal strength.

Namely, if the second beacon identification information is received at signal strength greater than predetermined received signal strength, it is determined that the terminal device 300 enters the corresponding store. Further, since repeated reception indicates a lengthy stay of the terminal device 300, various service contents may be offered to a user.

Also, at step S113, the control module 390 may receive, from the service management server 400, information about a direction of and/or a distance to a place (e.g., a store) capable of providing a registered beacon service.

Meanwhile, although it is described above that the control module 390 performs step of determining whether the second beacon identification information extracted from a beacon signal is identical with the first beacon identification information stored in the memory module 350, this step may be alternatively performed by the service management server 400.

A related description will be given hereinbefore with reference to FIG. 4.

The control module 390 of the terminal device 300 registers one or more beacon services in response to a user's request (step S201), and transmits information about the registered beacon services to the service management server 400 (step S203). Thereafter, the control module 390 may receive a beacon signal from the beacon device 200 (step S205), transmit the second beacon identification information contained in the receive beacon signal to the service management server 400 (step S207), and receive specific service content corresponding to the second beacon identification information from the service management server 400 (step S209).

Meanwhile, at step S209, the control module 390 may further receive, from the service management server 400, information about a direction of and/or a distance to a place (e.g., a store) capable of providing a specific beacon service registered at step S201.

Additionally, in case a beacon service registered at a user's request is a scheduler service, the control module 390 may further receive schedule information through the input module 310. Then the control module 390 may transmit the received schedule information to the service management server 400 and receive rescheduling information from the service management server 400 through the communication module 370. Then the control module 390 may control the output module 330 to offer the received rescheduling information to a user. As mentioned above, the aforesaid embodiments may be generally controlled and implemented by the control module 390.

Described heretofore are elements and operating process of the terminal device 300 according to embodiments of this invention.

Now, the service management server 400 according to embodiments of this invention will be described in more detail.

Figure 5:
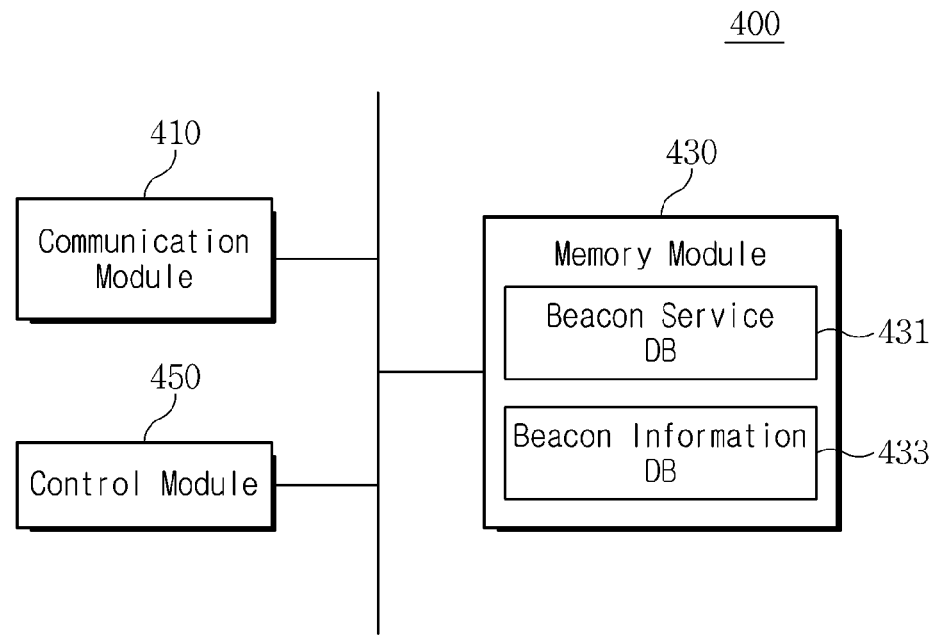
FIG. 5 is a block diagram illustrating a service management server according to an embodiment of the present invention.
Figure 6:
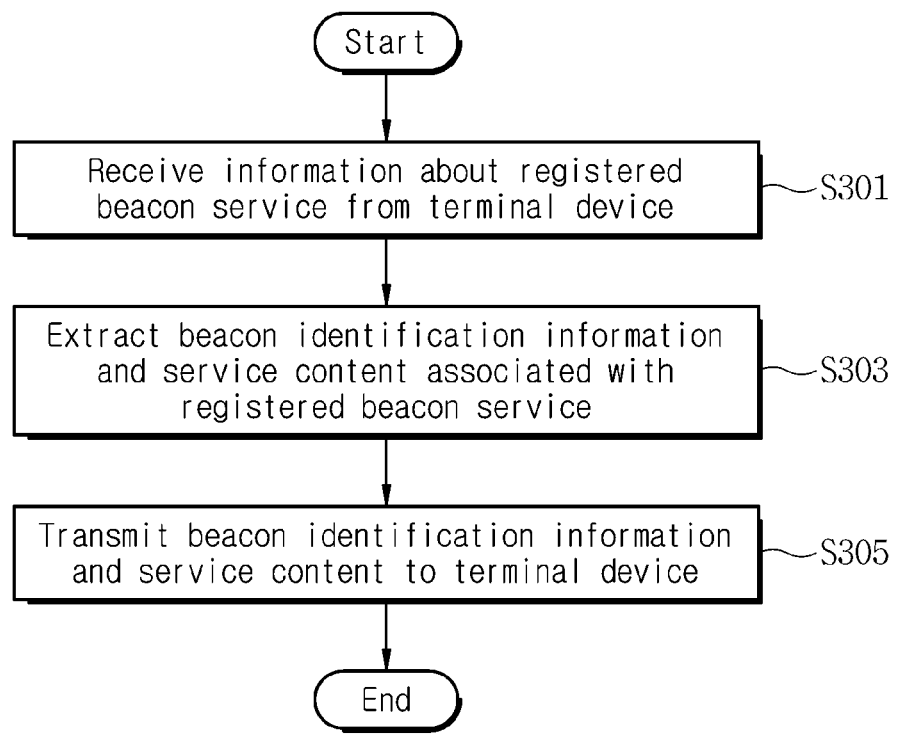
FIGS. 6 and 7 are flow diagrams illustrating an operating process of a service management server according to an embodiment of the present invention.
Figure 7:
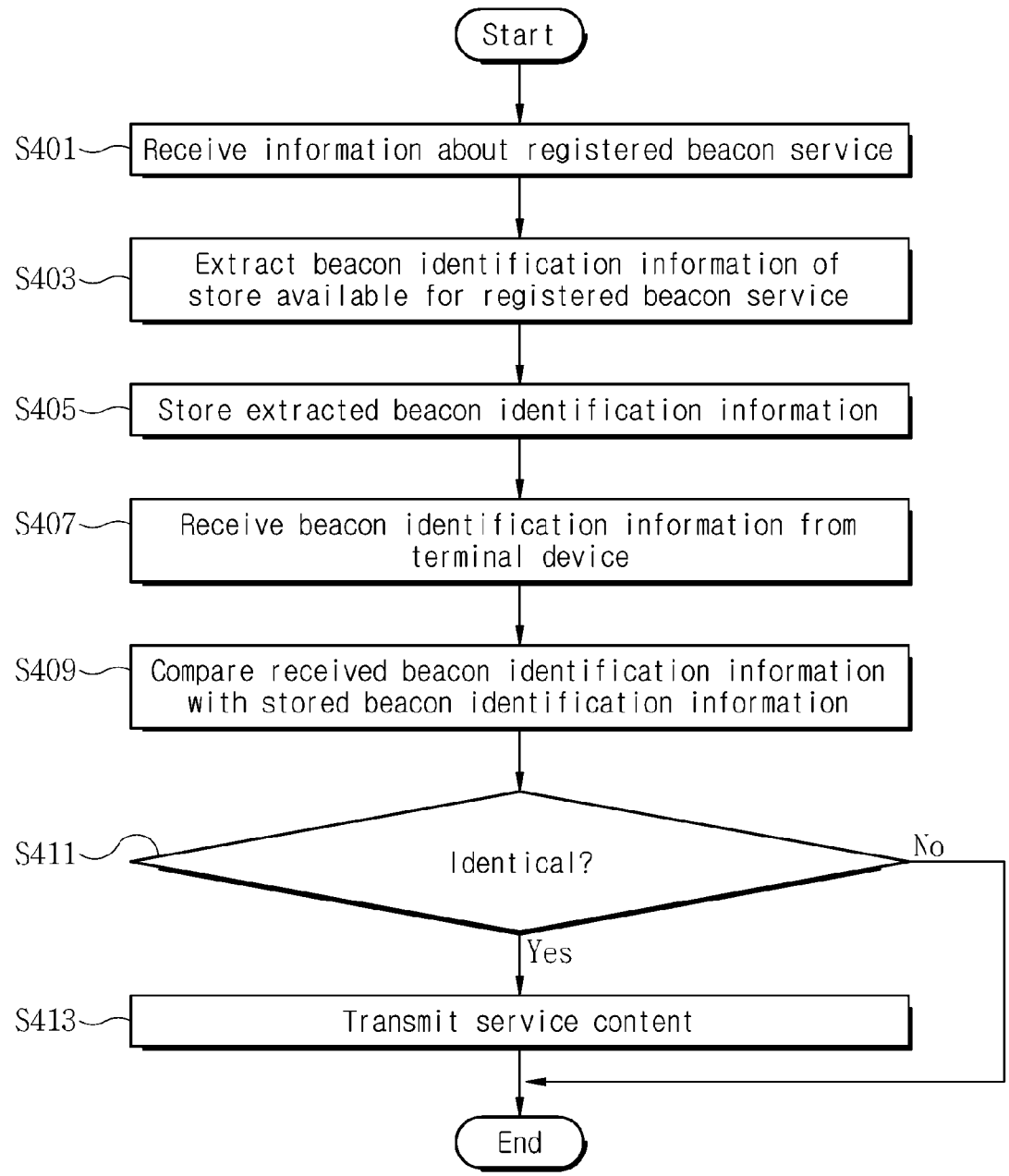

FIG. 5 is a block diagram illustrating a service management server according to an embodiment of the present invention. FIGS. 6 and 7 are flow diagrams illustrating an operating process of a service management server according to an embodiment of the present invention.

Referring to FIG. 5, the service management server 400 may include a communication module 410, a memory module 430, and a control module 450.

The communication module 410 is a device for communicating with the terminal device 300. The communication module 410 may use wireless communication technique such as, but not limited to, WLAN (Wireless Local Access Network), Wi-Fi, Wibro, Wimax, HSDPA (High Speed Downlink Packet Access), or the like. Alternatively or additionally, depending on system types, the communication module 410 may use wired communication technique such as Ethernet, xDSL (ADSL, VDSL), HFC (Hybrid Fiber Coaxial cable), FTTC (Fiber To The Curb), FTTH (Fiber To The Home), or the like.

Particularly, the service management server 400 may transmit or receive beacon service information, the first beacon identification information, the second beacon identification information, service contents, etc. to or from the terminal device 300 through the communication module 410.

The memory module 430 is a device for storing data and includes a main memory unit and an auxiliary memory unit. Further, the memory module 430 stores a program required for the operation of the service management server 400. The memory module 430 may include mainly a program region and a data region. When any function is activated in response to a user's request, the service management server 400 executes a relevant application and offers a particular function under the control of the control module 450.

Particularly, the memory module 450 may have a beacon service database (DB) 431 that records a registered beacon service received from the terminal device 300. Also, the memory module 450 may have a beacon information database 433 that records the first beacon identification information and service contents.

The beacon information DB 433 may have mapping relations among the first beacon identification information, information about service contents, information about the registered beacon service, and information about the terminal device 300.

The control module 450 is configured to control the overall operations of the service management server 400 according to embodiments of the present invention. Details are described hereinafter with reference to FIG. 6.

Referring to FIG. 6, an operating process of the service management server 400 is generally controlled by the control module 450. The control module 450 of the service management server 400 receives, from the terminal device 300, information about a beacon service registered in the terminal device 300 (step S301). Then the control unit 450 extracts the first beacon identification information and service content in connection with the registered beacon service on the basis of the received beacon service information (step S303) and then transmits the extracted first beacon identification information and service content to the terminal device 300 (step S305).

Particularly, at step S303, the control module 450 selects, from among all stores, a specific store capable of providing the registered beacon service and then extracts the first beacon identification information corresponding to the selected store. At this step, the control module 450 may further extract specific service content corresponding to the first beacon identification information.

In addition, the control module 450 may sequentially extract pieces of the first beacon identification information and corresponding service contents, based on locations of the terminal device 300 (namely, depending on movements of the terminal device 300) and also transmit them to the terminal device 300. Alternatively, the control module 450 may extract all pieces of the first beacon identification information and service contents associated with the registered beacon service and then, based on varying locations of the terminal device 300, transmit all or part of them to the terminal device 300.

Thereafter, when the terminal device 300 transmits the second beacon identification information to the service management server 400, the control module 450 may identify specific service content corresponding to the second beacon identification information and then transmit it to the terminal device 300.

Further, at step S305, the service management server 400 may transmit, to the terminal device 300, information about a direction of and/or a distance to a place (e.g., a store) capable of providing the registered beacon service. At this time, the service management server 400 may transmit such direction/distance information regarding all available stores or regarding a selected store which has the highest priority or the nearest location.

Meanwhile, contrary to the above-discussed embodiment in FIG. 6, the control module 450 of the service management sever 400 may offer service content to the terminal device 300 only when the first beacon identification information and the second beacon identification information are identical with each other.

A related description will be given hereinafter with reference to FIG. 7.

At the outset, the control module 450 receives, from the terminal device 300, information about one or more beacon services registered in the terminal device 300 (step S401). Then the control unit 450 extracts one or more pieces of first beacon identification information about one or more stores available for the registered beacon service on the basis of the received beacon service information (step S403).

At this step, the one or more pieces of first beacon identification information may be sequentially extracted depending on locations of the terminal device 300.

Meanwhile, the extracted first beacon identification information is stored in the memory module 430 (step S405). At this step, the control module 450 may store mapping relations among the first beacon identification information, corresponding service information, information about the terminal device 300, and information about service contents.

Thereafter, the service management sever 400 may receive the second beacon identification information from the terminal device 300 (step S407) and compares the received second beacon identification information with the stored first beacon identification information (step S409). If the received identification information is identical with the stored identification information, the service management server 400 transmits, to the terminal device 300, specific service content corresponding to the second beacon identification information (steps S411 and S413).

The service management server 400 may check a length of stay of the terminal device 300 at a specific place corresponding to the second beacon identification information and then, depending on the checked length of stay, offer specific service content to the terminal device 300. Namely, if the second beacon identification information having received signal strength being greater than predetermined received signal strength is received from the terminal device 300, the service management server 400 determines that the terminal device 300 enters a specific stored corresponding to the second beacon identification information. Also, the service management server 400 may calculate the length of stay on the basis of the number of continuously receiving the second beacon identification information and thereby transmit suitable service content to the terminal device 300.

In this case, the above suitable service content may be specific service content having a higher-level benefit in proportion to a longer length of stay of the terminal device 300.

Meanwhile, the service management server 400 may receive schedule information from the terminal device 300 and then perform a function to manage a user's schedule. A related description will be given below in detail.

Described heretofore are elements and an operating process of the service management server 400 according to embodiments of this invention.

As mentioned above, the above-discussed operating process is generally controlled by the control module 450 of the service management server 40.

Now, a beacon service provision method according to an embodiment of this invention will be described in detail.

Figure 8:
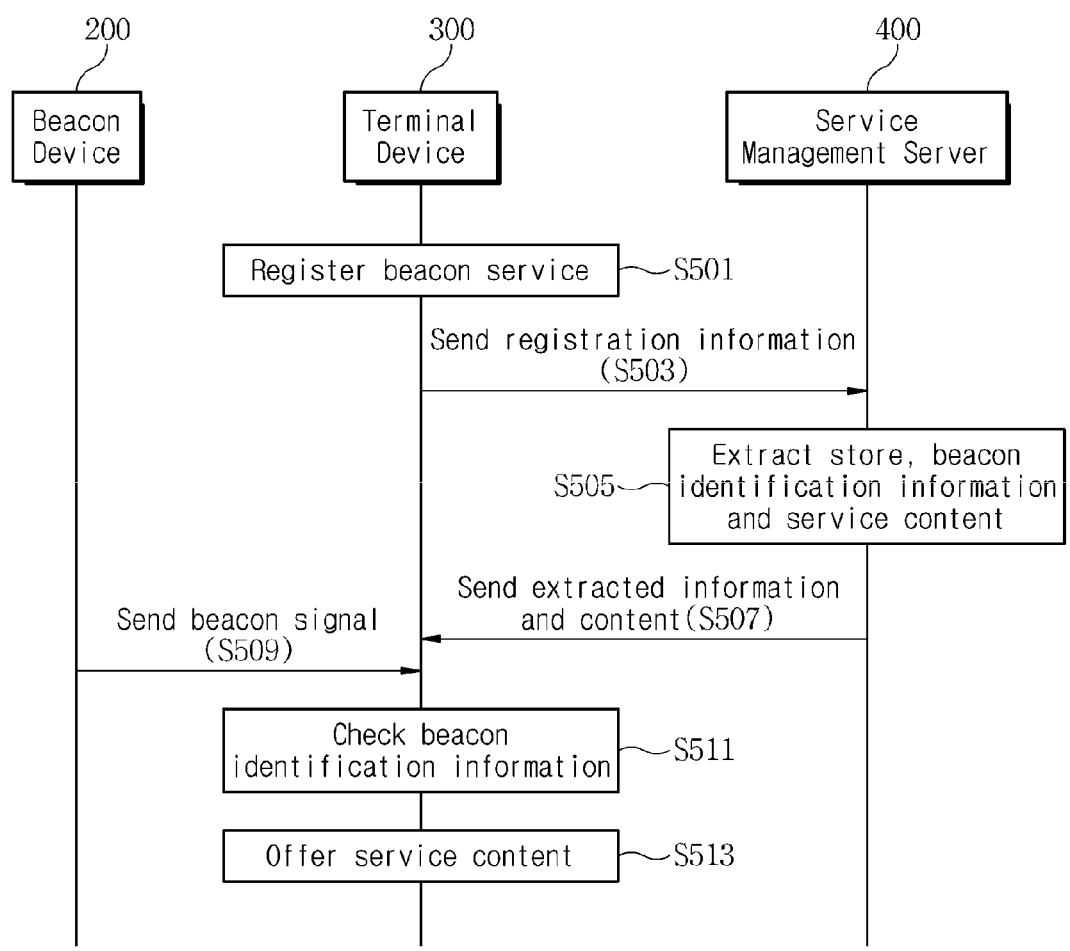
FIGS. 8 and 9 are flow diagrams illustrating a method for providing a beacon service according to an embodiment of the present invention.
Figure 9:
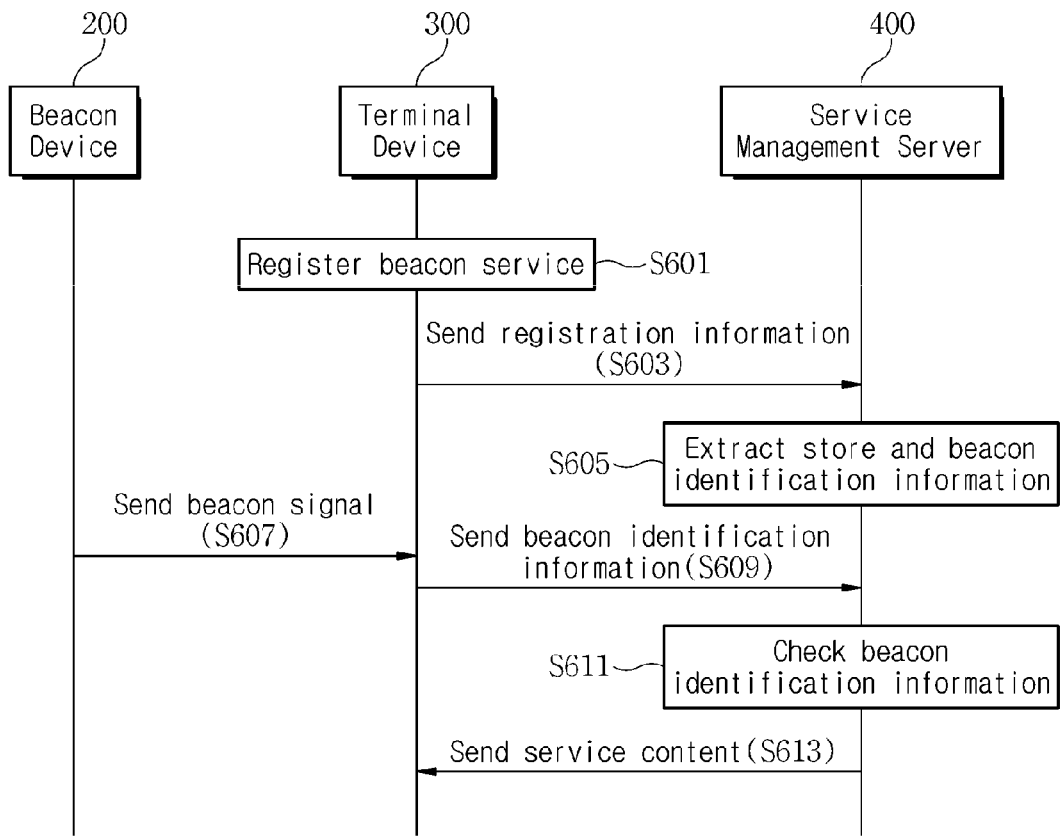
Figure 10:
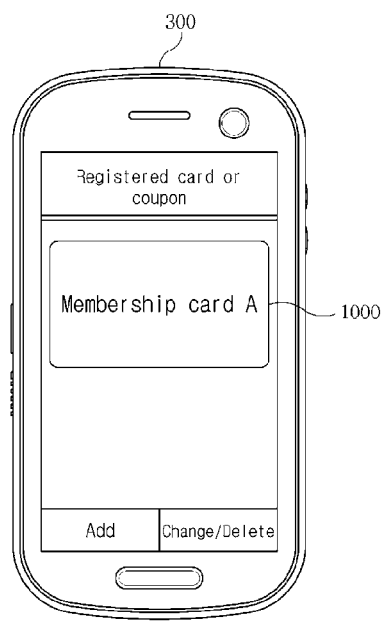
FIGS. 10 to 12 are exemplary diagrams illustrating a method for providing a beacon service according to an embodiment of the present invention.
Figure 11:
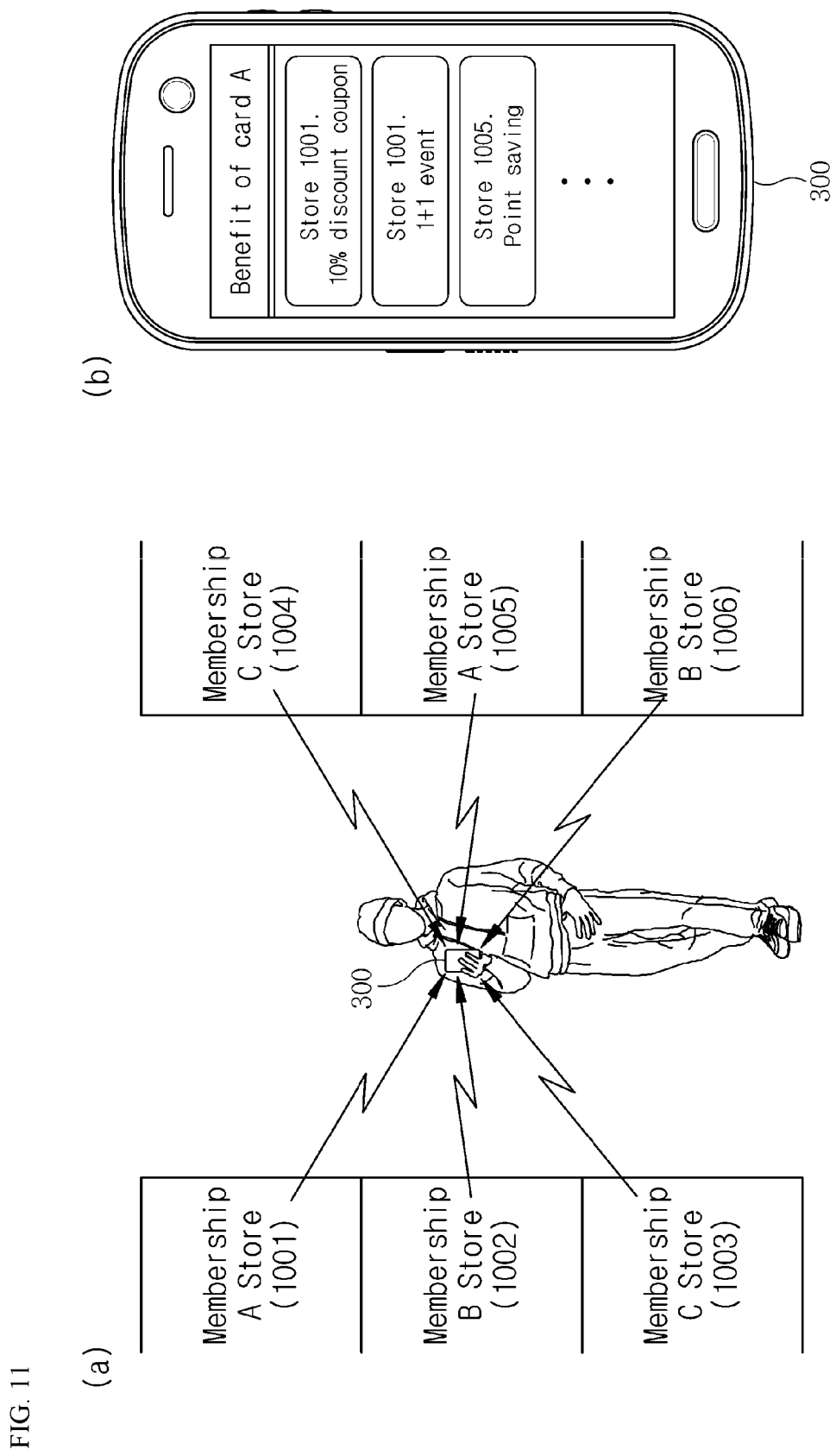
Figure 12:
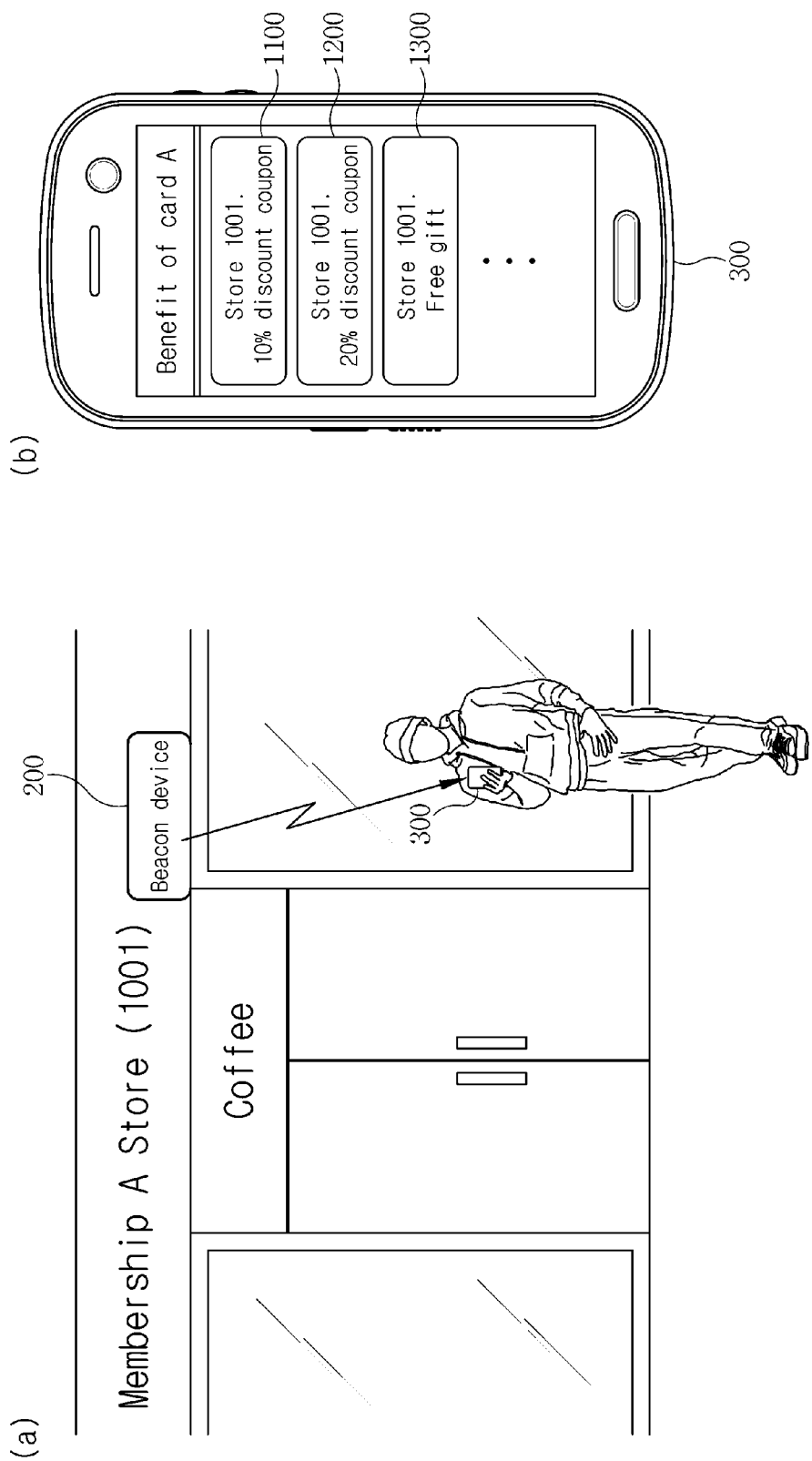

FIGS. 8 and 9 are flow diagrams illustrating a method for providing a beacon service according to an embodiment of the present invention. FIGS. 10 to 12 are exemplary diagrams illustrating a method for providing a beacon service according to an embodiment of the present invention.

FIG. 8 shows the beacon service provision method implemented mainly by the terminal device 300, and FIG. 9 shows the beacon service provision method implemented mainly by the service management server 400.

Referring to FIG. 8, the terminal device 300 registers a beacon service at a user's request (step S501) and transmits information about the registered beacon service to the service management server 400 (step S503).

Then the service management server 400 selects a store capable of providing the registered service and extracts the first beacon identification information of the beacon device corresponding to the selected store (step S505). Also, the service management server 400 transmits the extracted first beacon identification information to the terminal device (step S507).

At steps S505 and S507, the service management server 400 may further extract specific service content associated with the registered beacon service and transmit it to the terminal device 300. Then the terminal device 300 may store the received service content together with the first beacon identification information.

Also, the service management server 40 may sequentially transmit, to the terminal device 300, two or more pieces of the first beacon identification information and corresponding service contents, based on variations in location of the terminal device 300.

As discussed above, such sequential transmission is intended to obviate a shortage of memory in the terminal device 300.

Thereafter, the terminal device 300 receives a beacon signal from the beacon device 200 (step S509) and determines whether the second beacon identification information contained in the received beacon signal is identical with the stored first beacon identification information (step S511). If identical, the terminal device 300 offers service content to a user (step S513).

If such service content has been already received and stored at step S507, the terminal device 300 may offer the stored service content to a user at step S513. On the contrary, if corresponding service content has been not yet received, the terminal device 300 may transmit the second beacon identification information to the service management server 400 and receive corresponding service content from the service management server 400 so as to offer it to a user.

Additionally, the terminal device 300 may check a length of stay at a specific store and then offer specific service content to a user, depending on the checked length of stay. This length of stay may be calculated on the basis of the number of continuously receiving the second beacon identification information at signal strength greater than predetermined received signal strength.

Next, referring to FIG. 9, the terminal device 300 registers a beacon service at a user's request (step S601) and transmits information about the registered beacon service to the service management server 400 (step S603). Then the service management server 400 extracts and stores the first beacon identification information associated with the registered beacon service (step S605).

The first beacon identification information associated with the registered beacon service may mean identification information of the beacon device installed in a specific store capable of providing the registered beacon service.

Additionally, the service management server 400 may extract the first beacon identification information, depending on locations of the terminal 300.

Thereafter, the terminal device 300 receives a beacon signal from the beacon device 200 (step S607) and transmits the second beacon identification information contained in the received beacon signal to the service management server 400 (step S609).

Then the service management server 400 compares the received second beacon identification information with the stored first beacon identification information (step S611). If both types of information are identical with each other, the service management server 400 transmits specific service content corresponding to the second beacon identification information to the terminal device 300 (step S613).

Additionally, the service management server 400 may check a length of stay at a specific store corresponding to the second beacon identification information and then offer various service contents to the terminal device 300, depending on the checked length of stay. This length of stay may be calculated on the basis of the number of continuously receiving the second beacon identification information at signal strength greater than predetermined received signal strength.

Hereinafter, some examples of the above-discussed beacon service provision method will be described. At the outset, referring to FIG. 10, information about a specific beacon service 'Membership card A' 1000 is registered in the terminal device 300 in response to a user's request.

Then, as shown in part (a) of FIG. 11, a user having the terminal device 300 receives beacon signals from the beacon devices 200 installed respectively in stores 1001, 1002, 1003, 1004, 1005 and 1006.

Among these stores, registered in the terminal device 300 in connection with 'Membership card A' 1000 are only two stores 1001 and 1005.

Therefore, as shown in part (b) of FIG. 11, the terminal device 300 can offer, to a user, benefits about these stores 1001 and 1005 which are associated with 'Membership card A'. However, the terminal device 300 fails to offer, to a user, service contents corresponding to the second beacon identification information contained in beacon signals emitted from the other stores 1002, 1003, 1004 and 1006 which are associated with 'Membership card B' or 'Membership card C'.

FIG. 12 shows that a user having the terminal device 300 visits and stays at the store 1001. Therefore, while this user stays at the store 1001, the terminal device 300 continuously receives a beacon signal from the beacon device 200 installed in the store 1001. If the received signal strength is greater than predetermined received signal strength, the terminal device 300 determines that the length of stay increases, and thereby continuously offers related service contents to the user.

Part (b) of FIG. 12 shows that according as the length of stay increases, benefits 1100, 1200 and 1300 are offered better and better to the user.

Now, a beacon service provision method according to another embodiment of this invention will be described in detail.

Figure 13:
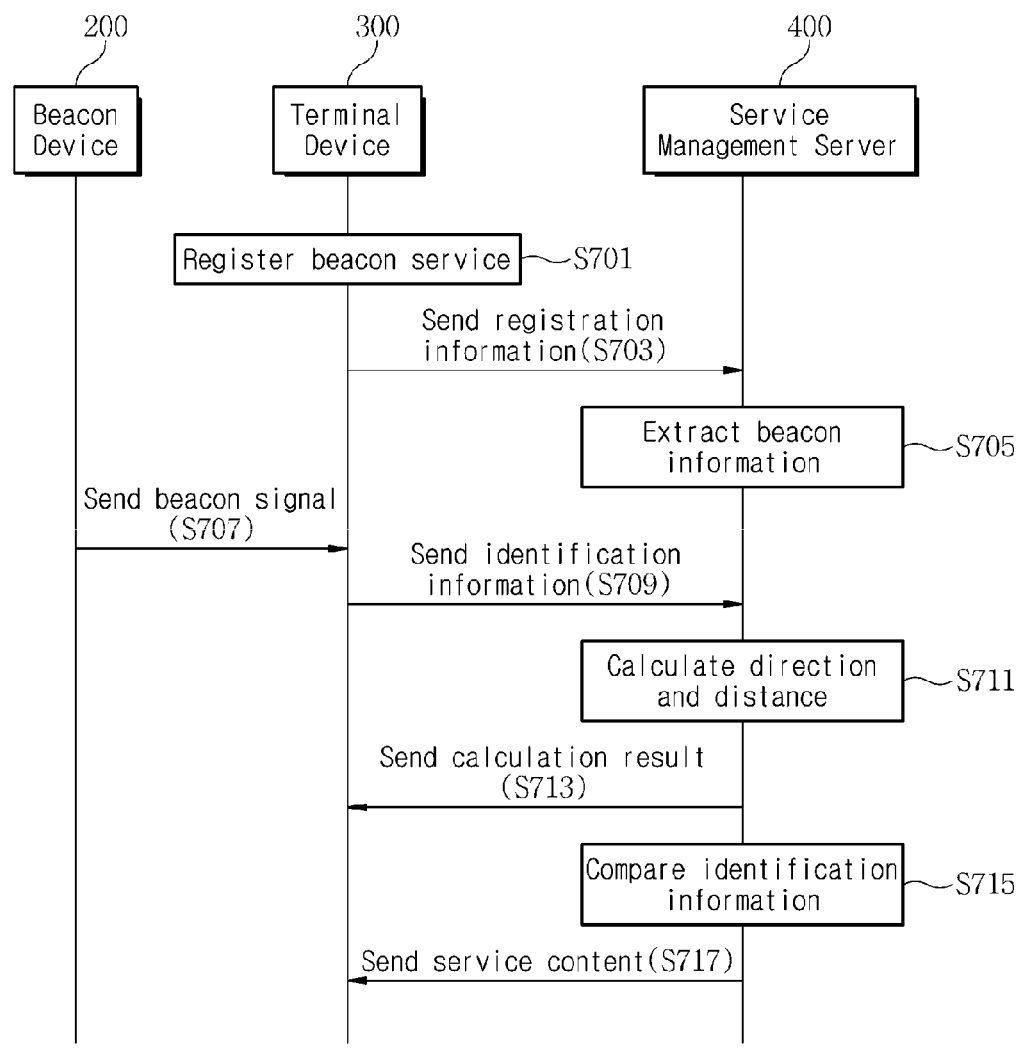
FIG. 13 is a flow diagram illustrating a method for providing a beacon service according to another embodiment of the present invention.

FIG. 13 is a flow diagram illustrating a method for providing a beacon service according to another embodiment of the present invention. FIGS. 14 to 17 are exemplary diagrams illustrating a method for providing a beacon service according to another embodiment of the present invention.

In beacon service provision method according to this embodiment, the service management server 400 offers, to a user, detailed information such as a distance and direction to a specific store where the user can use a desired beacon service.

Referring to FIG. 13, the terminal device 300 registers a beacon service at a user's request (step S701) and transmits registration information of the beacon service to the service management server 400 (step S703). Then the service management server 400 extracts at least one first beacon identification information corresponding to the received beacon service information and then registers it (step S705).

Thereafter, the terminal device 300 receives a beacon signal from the beacon device 200 (step S707) and then transmits the second beacon identification information, contained in the received at least one beacon signal, to the service management server 400 (step S709). Therefore, the service management server 400 may collect the second beacon identification information in real time.

Based on the collected second beacon identification information, the service management server 400 determines whether at least one store corresponding to the registered first beacon identification information is located within a predetermined range from the terminal device 300. If there is at least one store located within the predetermined range, the service management server 400 calculates, based on the second beacon identification information, a direction and distance from the terminal device 300 to at least one store corresponding to the registered first beacon identification information (step S711), and then transmits the calculated information to the terminal 300 (step S713).

Since the second beacon identification information contains location information of the beacon device 200 corresponding to the second beacon identification information, the service management server 400 may estimate the location of the terminal device 300 from the location of the beacon device 200 and also determine whether any store corresponding to the first beacon identification information is located within the predetermined range from the terminal device 300.

Meanwhile, in order to calculate such a direction and distance, more exact information about a current location of the terminal device 300 may be needed. Therefore, using GPS information or through triangulation based on the second beacon identification information, the current location of the terminal device 300 may be calculated.

Namely, the terminal device 300 may send the second beacon identification information, contained in a plurality of received beacon signals, to the service management server 400, and then the service management server 400 may calculate the current location of the terminal device 300 by using triangulation based on location information and signal strength information associated with a plurality of the second beacon identification information.

Then, based on the calculated current location of the terminal device 300, the service management server 400 may calculate a direction and distance to at least one store.

Additionally, when transmitting, to the terminal device 300, information about the calculated direction and distance, the service management server 400 may send information about a direction and distance to a specific store that offers service content having the highest priority from among all service contents corresponding to the first beacon identification information.

Namely, considering higher benefits or event closing times, the service management server 400 may define priorities of stores having the calculated direction and distance and then send, to the terminal device 300, information about a direction and distance to a specific store that offers service content having the highest priority.

Also, the service management server 400 may transmit, to the terminal device 300, information about a direction and distance to a specific store that is closest from the terminal device 300.

When entering or approaching a certain store corresponding to the first beacon identification information, the terminal device 300 may receive a beacon signal from a certain beacon device of the store and then transmits the second identification information contained in the received beacon signal to the service management server 400. In this case, the first beacon identification information may be identical with the second beacon identification information.

Therefore, the service management server 400 may compare the first beacon identification information with the second beacon identification information (step S715) and then, if both are identical with each other, transmit service content, instead of the direction and distance, corresponding to the second beacon identification information (step S717).

Namely, when the first beacon identification information is identical with the second beacon identification information, the above-discussed steps S711 and S713 may be skipped and instead steps S715 and S717 may be performed.

Additionally, in case of sending service content, the service management server 400 may calculate the length of stay of the terminal device 300 at a store corresponding to the second beacon identification information and then send specific service content corresponding to the calculated length of stay to the terminal device 300. In this case, the length of stay may be calculated on the basis of the number of continuously receiving the second beacon identification information with signal strength greater than predetermined signal strength.

Figure 14:
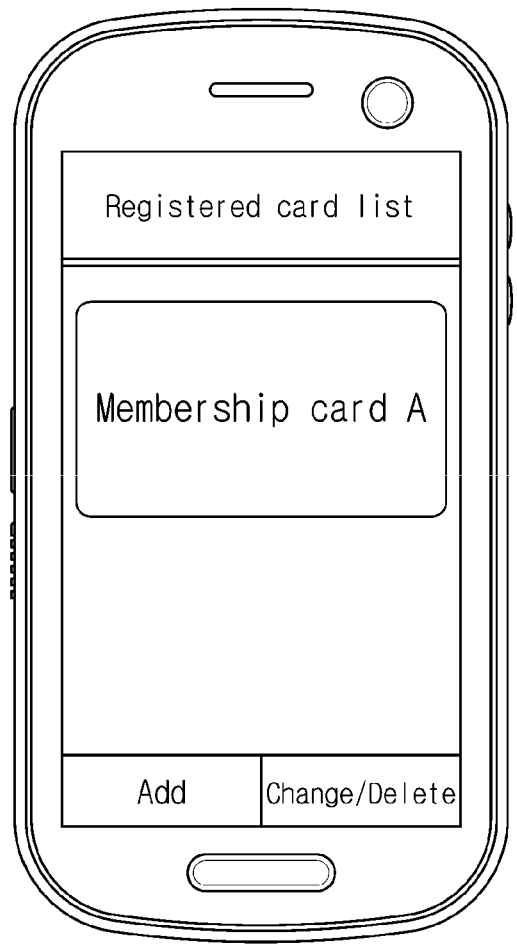
FIGS. 14 to 17 are exemplary diagrams illustrating a method for providing a beacon service according to another embodiment of the present invention.

One example is shown in FIG. 14. Referring to FIG. 14, the terminal device 300 registers 'Membership card A' therein and sends such registration information to the service management server 400.

Then the service management server 400 may extract at least one store capable of offering a service associated with 'Membership card A' and register the extracted store therein.

Figure 15:
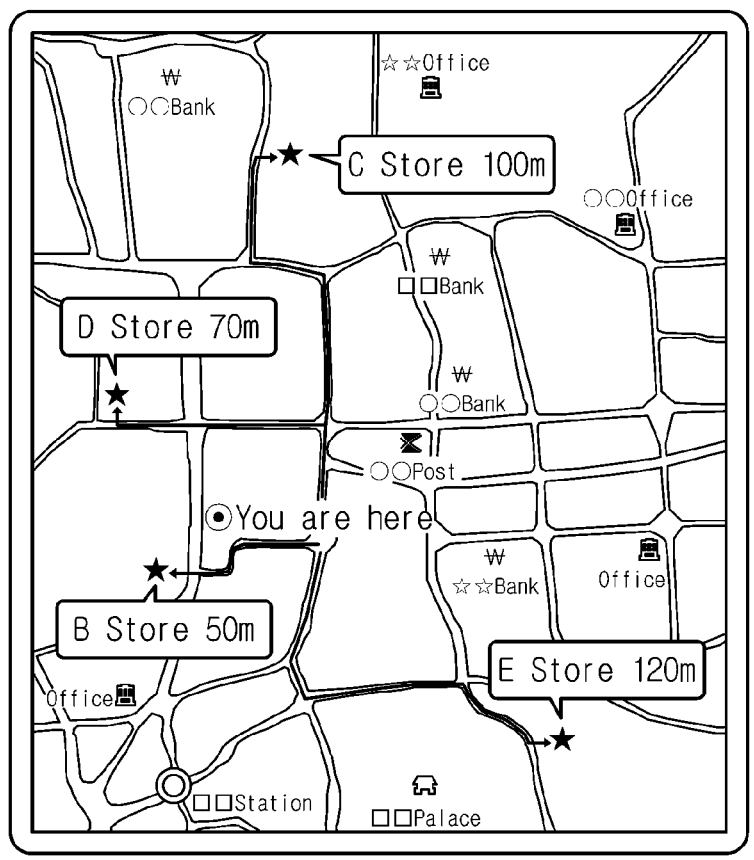

FIG. 15 shows a map, displayed on the terminal device 300, containing some stores each having a direction and distance calculated by the service management server 400 on the basis of the registered beacon service information.

As shown in FIG. 15, the service management server 400 may extract four stores B, C, D and E for offering a service associated with 'Membership card A' within a predetermined range from the terminal device 300. Also, the service management server 400 may obtain the current location of the terminal device 300 by using the GPS sensor or through triangulation and then calculate a direction and distance from the terminal device 300 to each store. Then the service management server 400 may offer such information to the terminal device 300.

Figure 16:
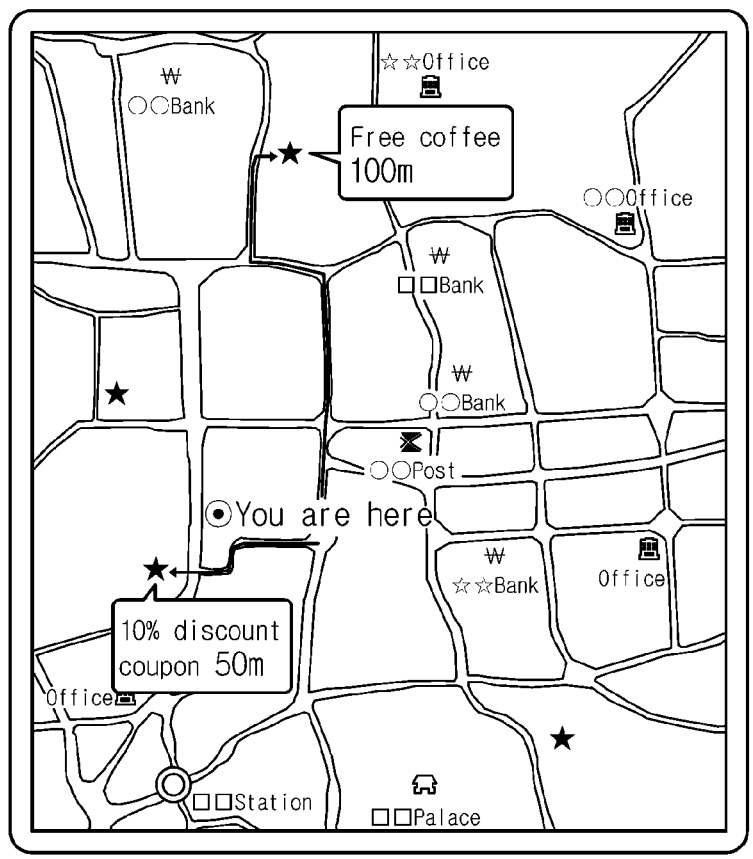

FIG. 16 shows another map displayed on the terminal device 300. As shown in FIG. 16, the service management server 400 may select the store B which is closest from the terminal device 300 and also select the store C which offers service content having the highest priority. Then the service management server 400 may offer such information to the terminal device 300.

Figure 17:
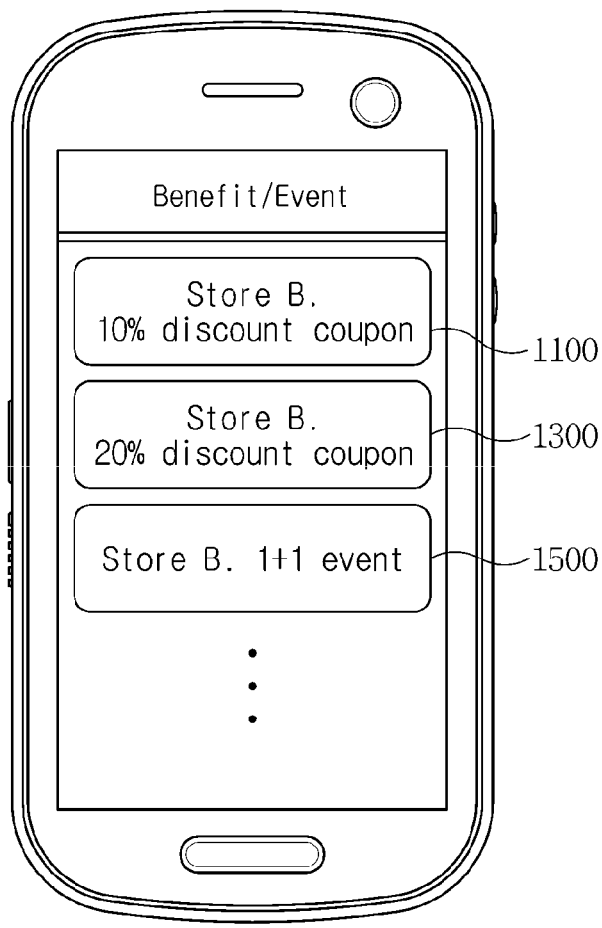

FIG. 17 shows a screenshot of the terminal device 300. When a user having the terminal device 300 enters or approaches the store B, the terminal device 300 may receive a beacon signal containing the second beacon identification information from the beacon device 200 installed in the store B and then compare the second beacon identification information with the first beacon identification information. If both are identical with each other, the terminal device 300 may offer service contents 1100, 1300 and 1500 corresponding to the second beacon identification information to the user.

In this case, the service management server 400 may calculate the length of stay of the terminal device 300 at the store B and then offer specific service content corresponding to the calculated length of stay. For example, according as the length of stay increases, service contents having better benefits may be offered to the user. Namely, as shown in FIG. 17, service contents 1100, 1300 and 1500 are offered sequentially in proportion to the length of stay.

Now, a beacon service provision method according to still another embodiment of this invention will be described in detail.

Figure 18:
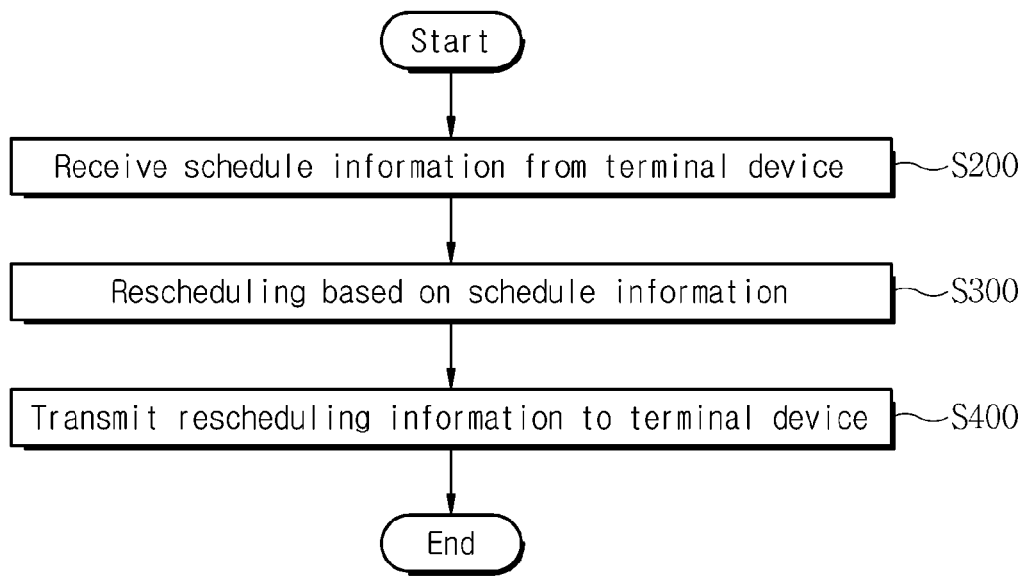
FIGS. 18 and 19 are flow diagrams illustrating a method for providing a beacon service according to still another embodiment of the present invention.
Figure 19:
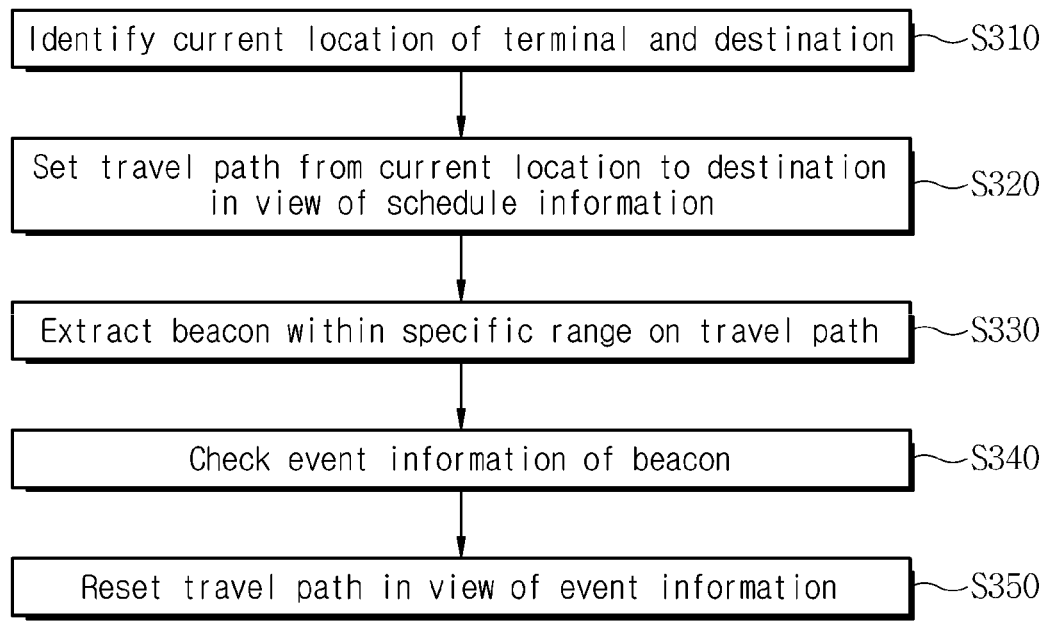

FIGS. 18 and 19 are flow diagrams illustrating a method for providing a beacon service according to still another embodiment of the present invention. FIGS. 20 to 24 are exemplary diagrams illustrating a method for providing a beacon service according to still another embodiment of the present invention.

This method according to still another embodiment may be performed when the service management server 400 provides a scheduler service to the terminal device 300.

Although the following description is based on the supposition that there is a single beacon device at a specific place, this is exemplary only. Alternatively, two or more beacon devices may exist at such a place.

Referring to FIG. 18, the service management server 400 receives schedule information, as beacon service information, from the terminal device 300 and then registers it (step S200). This step may be performed periodically or whenever such schedule information occurs at the terminal device 300. Regardless of a receiving cycle of schedule information, the service management server 400 creates rescheduling information at regular intervals. For example, the service management server 400 may create rescheduling information day by day, based on schedule information received from a user, and then transmit the rescheduling information to the terminal device 300 every morning. Further, the service management server 400 may frequently send a notification message to the terminal device 300 such that a user can recognize the rescheduling information.

Like this, the service management server 400 reschedules a user's schedule based on the received schedule information (step S300).

This rescheduling step is shown in detail in FIG. 19. The schedule information received from the terminal device 300 in connection with a beacon service may be various types of information, such as a current location of the terminal device 300, an hourly schedule, and destination information, associated with schedules entered by a user in the terminal device 300. For example, if a user of the terminal device 300 inputs a visit to a bakery and a visit to a bookstore, as things to do, and if an appointment of today evening is recorded in a certain SMS message, the service management server 400 receives such schedule information from the terminal device 300 and, based on the received schedule information, identifies the current location of the terminal device 300 and a destination (step S310). Then the service management server 400 establishes a travel path from the current location to the destination, based on the schedule information (step S320). For example, if user's schedule information indicates visits to places A, B and C, the service management server 400 may set a travel path in the order of B, C and A from the current location by considering geographical locations of the above places. This travel path may be the shortest path in view of geographical locations.

Figure 20:
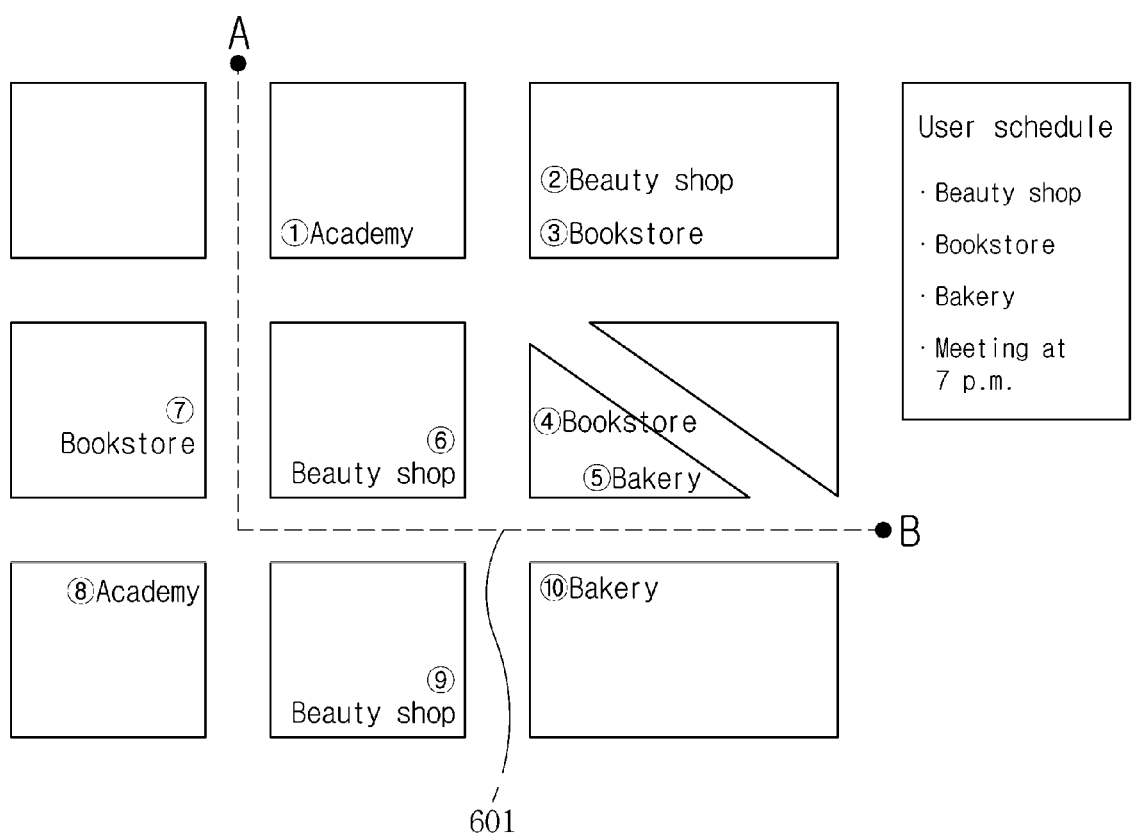
FIGS. 20 to 24 are exemplary diagrams illustrating a method for providing a beacon service according to still another embodiment of the present invention.

FIG. 20 shows an example. In this example, the service management server 400 may ascertain that schedule information received from the terminal device 300 contains "a beauty shop, a bookstore, a bakery, and a meeting at 7 p.m.". Then, based on this schedule information, the service management server 400 may identify the final destination (B) from the current location (A) and establish a travel path 601 from the current location to the final destination. This travel path may be the shortest path in view of geographical locations.

Figure 21:
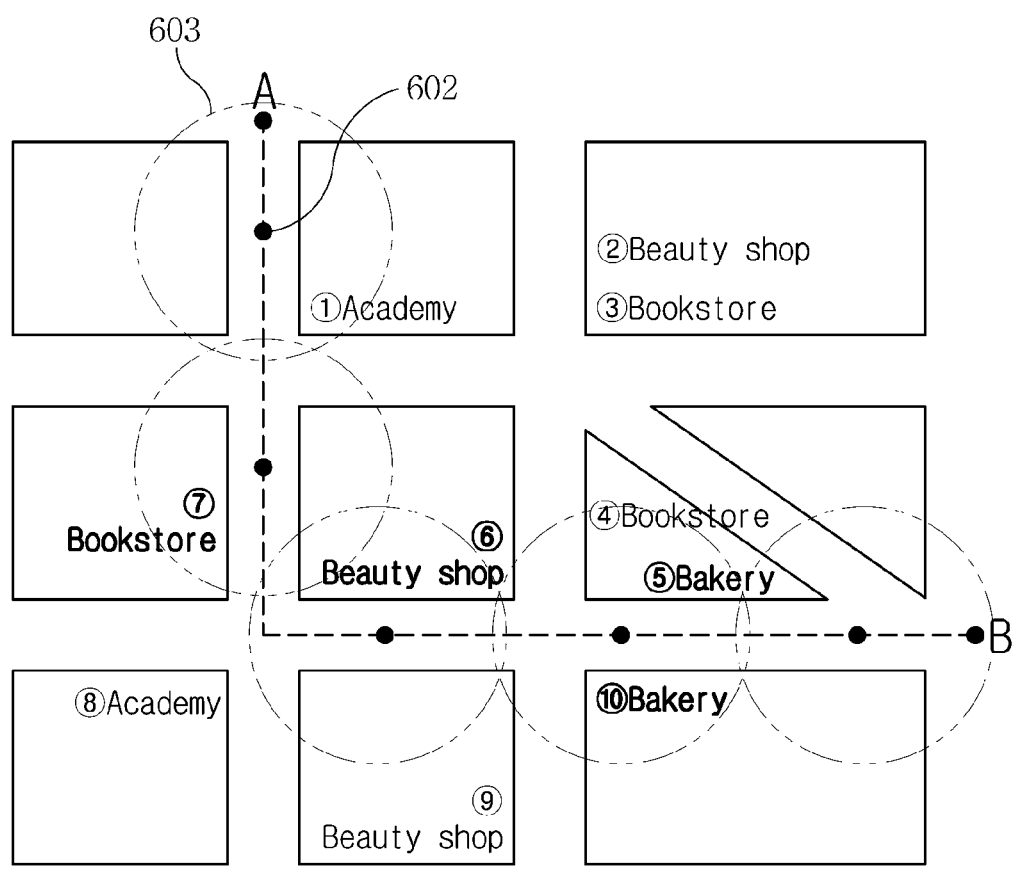

Returning to FIG. 19, the service management server 400 extracts beacon devices deployed within a specific range on the travel path (step S330). Namely, as shown in FIG. 21, the service management server 400 selects specific points on the travel path and then, based on the user schedule information, extracts identification information of the beacon device 200 located within a predetermined range from each selected point.

For example, the service management server 400 ascertains that the beacon devices 200 are installed at five places corresponding to an academy (first beacon device), a bookstore (seventh beacon device), a beauty shop (sixth beacon device), a bakery (fifth beacon device), and another bakery (tenth beacon device). Then, by considering the user schedule information containing no visit to an academy, the service management server 400 extracts only four beacon devices other than the first beacon device.

Additionally, by considering geographical locations, the service management server 400 may perform rescheduling for the extracted beacon devices 200, e.g., in the order of A, 7, 6, 5 (or 10) and B. At this time, the length of stay at each place may be further considered.

Returning again to FIG. 19, the service management server 400 checks event information associated with the beacon device 200 (step S340). In the above example shown in FIG. 21, the extracted beacon devices 200 are the seventh beacon device (a bookstore), the sixth beacon device (a beauty shop), the fifth beacon device (a bakery), and the tenth beacon device (another bakery), and beacon identification information of these beacon devices are extracted as the first beacon identification information. Then the service management server 400 checks event information corresponding to the first beacon identification information. In addition, based on the event information, the server management server 400 creates rescheduling information by resetting the travel path in view of the event information (step S350).

Figure 22:
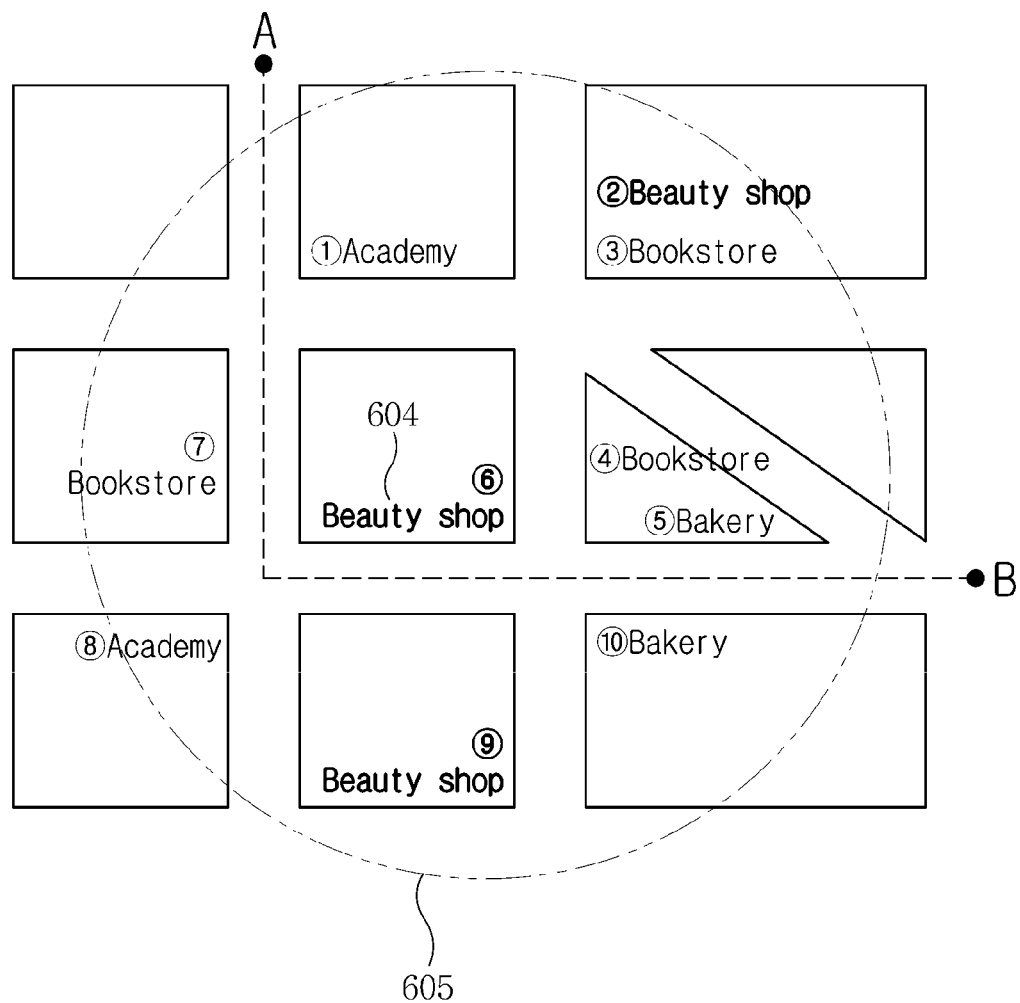

For example, as shown in FIG. 22, the service management server 400 may ascertain that a beauty shop 604 having the sixth beacon device plans an event "a big discount sale in the morning". In this case, a visit to a beauty shop before a visit to a bookstore may be advantageous to the user. Therefore, the service management server 400 that checks event information of the respective beacon devices 200 may select a specific beacon device to visit first of all and then extract the first beacon identification information of the specific beacon device.

Additionally, the service management server 400 may check whether there is any similar beacon device within a certain range 605 from the selected (e.g., the sixth) beacon device. As a result, the second and ninth beacon devices installed in other beauty shops may be found. Then the service management server 400 may compare event information regarding these beacon devices. If an event of a beauty shop having the second beacon device is more advantageous than that of the sixth beacon device, the service management server 400 may suggest a visit to a beauty shop having the second beacon device instead of a visit to a beauty shop having the sixth beacon device.

Figure 23:
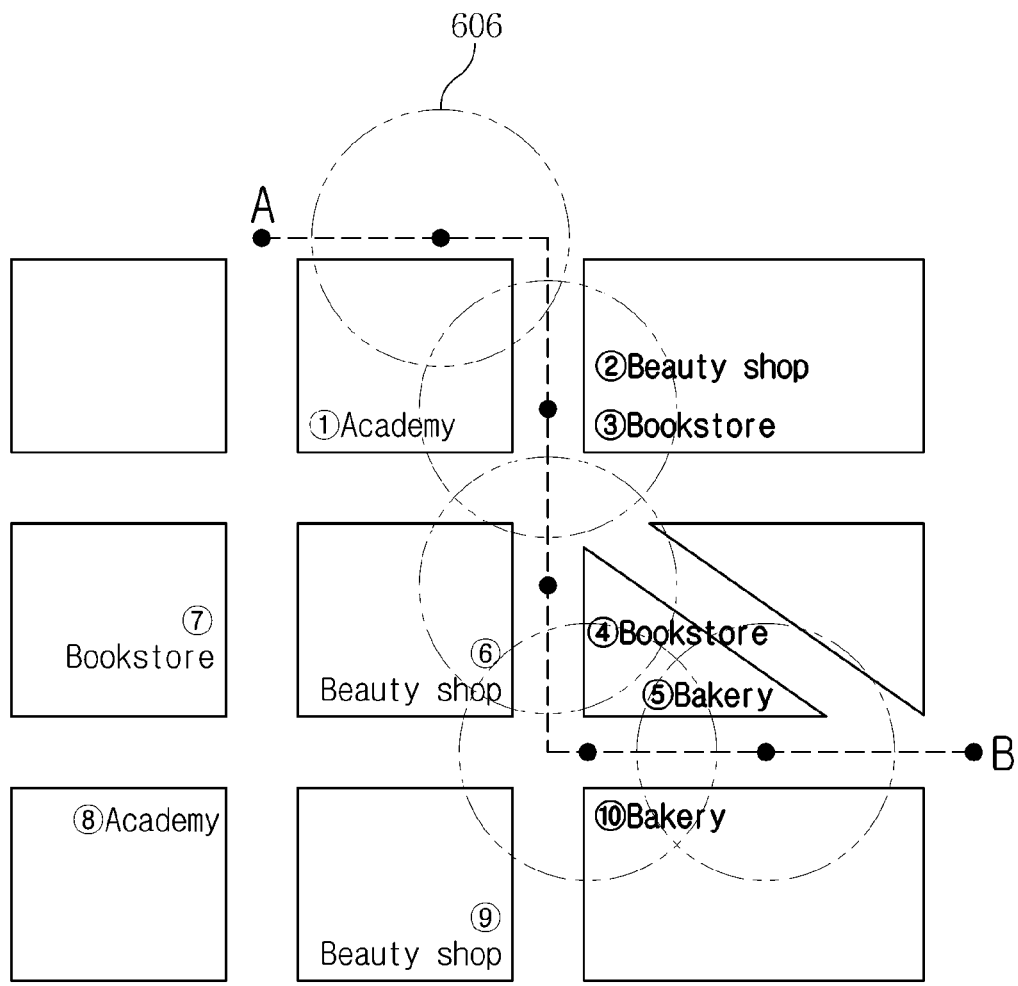

Then, as shown in FIG. 23, the service management server 400 resets the travel path from the current location to the destination so as to pass the second beacon device. Also, the service management server 400 may extract additional beacon devices 200 deployed within a specific range on the travel path. For example, the service management server 400 may ascertain that the beacon devices 200 are further installed at four places corresponding to a bookstore (third beacon device), another bookstore (fourth beacon device), a bakery (fifth beacon device), and another bakery (tenth beacon device).

As the result of checking event information corresponding to the extracted beacon devices, it may be ascertained that there is no event information, or it may be difficult to define priorities regarding event information. In this case, the service management server 400 may further consider any other information, such as a payment method, a purchase history, favorites, or a customer point, so as to select a specific place to visit first of all. For example, if two bookstores having the third and fourth beacon devices are similar in event information, the service management server 400 may check information about a credit card in the event information, select one of two bookstores in view of benefits of the credit card, and then create rescheduling information to pass the selected bookstore. If it is difficult to select a specific place to visit first of all on the basis of any condition, geographical locations may be considered.

Figure 24:
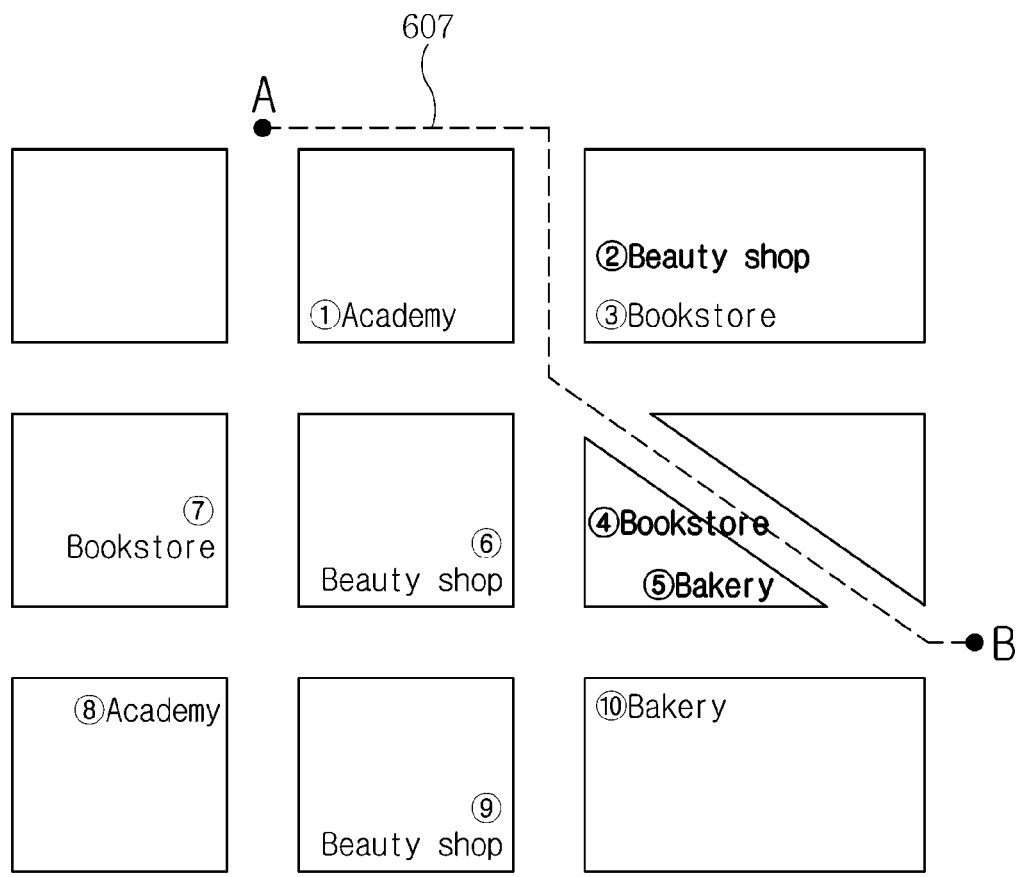

Through the above-discussed process, the service management server 400 may determine a final travel path 607 as shown in FIG. 24 and then create rescheduling information based on the final travel path. In order to create the rescheduling information, the service management server 400 may further consider a time required at each place. Then the service management server 400 delivers the created rescheduling information to the terminal device 300 and may control a beacon service application of the terminal device 300 to dynamically display the travel path or send a push notification message to the terminal device 300 on the basis of the rescheduling information.

Meanwhile, the terminal device 300 may visually display the rescheduling information, received from the service management server 400, along the travel path and also receive the push notification information from the service management server 400. In addition, the terminal device 300 may ascertain the first beacon identification information contained in the rescheduling information and then, if any beacon signal containing the second beacon identification information is received from a certain beacon device 200 while moved, check whether the second beacon identification information is identical with the first beacon identification information.

Further, the terminal device 300 may extract the second beacon identification information from the beacon signal of a certain beacon device 200 deployed on the travel path, send the extracted second beacon identification information to the service management server 300, and receive specific content corresponding to the second beacon identification information. If a user of the terminal device 300 stays at a certain place longer than a time planned in the rescheduling information or deviates from the travel path planned in the rescheduling information, the service management server 400 may ascertain that the second beacon identification information received from the terminal device 300 is not identical with the first beacon identification information of the beacon device 200 located on the travel path. Then the service management server 400 may revise the rescheduling information and send it to the terminal device 300, or send a push message to the terminal device 300 so as to remind a user of the rescheduling information.

Hereinbefore, the beacon service provision methods are described according various embodiments of this invention.

These methods may be favorably implemented in an operating environment to be discussed hereinafter.

Figure 25:
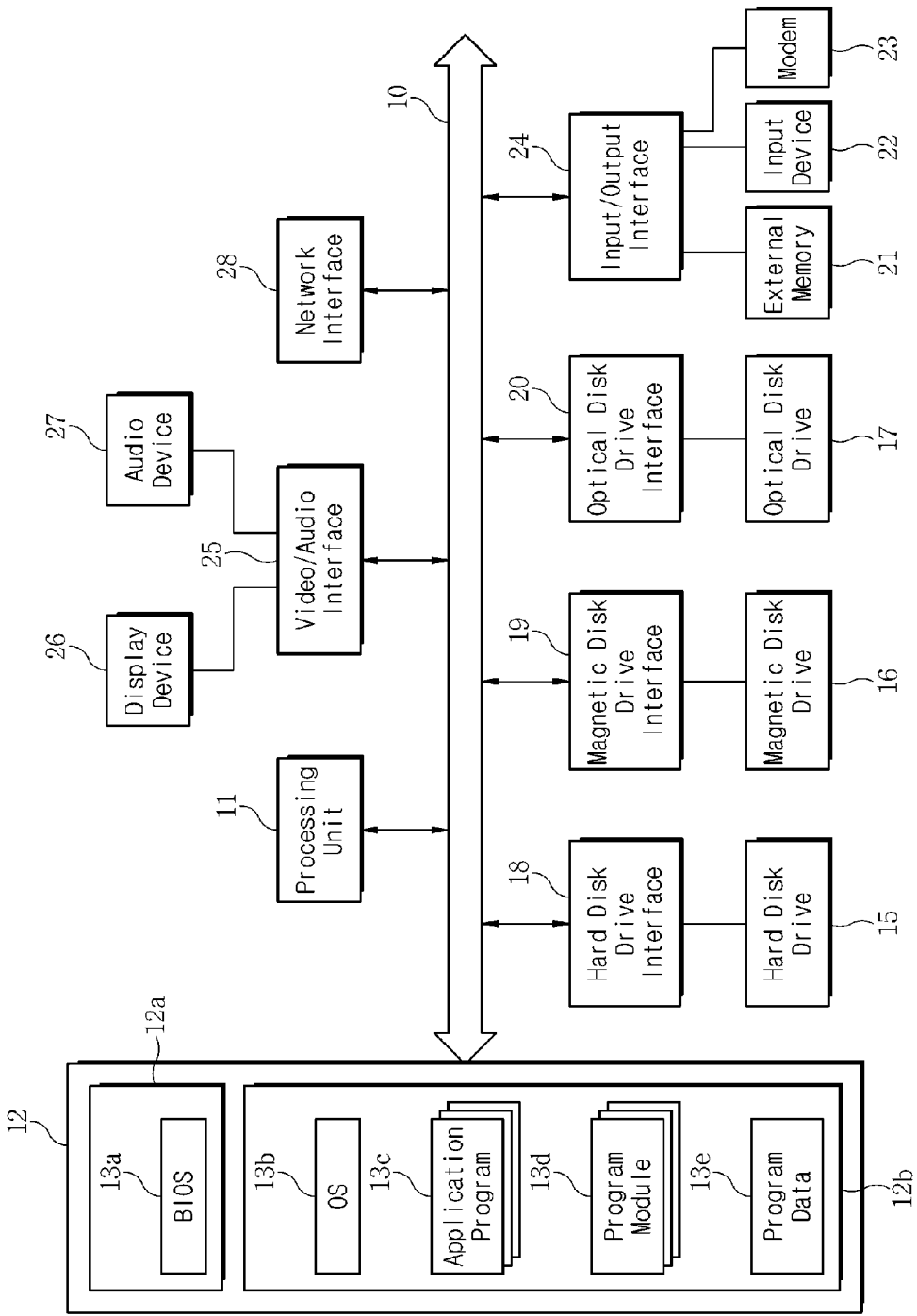
FIG. 25 is a block diagram illustrating an operating environment of an apparatus for providing a beacon service according to an embodiment of the present invention.

FIG. 25 is a block diagram illustrating an operating environment of an apparatus for providing a beacon service according to an embodiment of the present invention.

FIG. 25 and the following discussion are intended to provide a brief, general description of an example suitable computing environment in which the invention may be implemented. Although not required (e.g., when implemented in hardware), the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

Referring to FIG. 25, an exemplary computing system for implementing the invention includes a processing unit 11, a system memory 12, and a system bus 10 that couples various system components including the system memory 12 to the processing unit 11.

The processing unit 11 can execute computer-executable instructions designed to implement features of this invention.

The system bus 10 may be any of several, types of bus structures including a memory bus or memory controller, a peripheral bus, and a local bus using any of a variety of bus architectures.

The system memory 12 includes read only memory (ROM) 12a and random access memory (RAM) 12b.

A basic input/output system (BIOS) 13a, containing the basic routines that help transfer information between elements within computer system, such as during start-up, may be stored in the ROM 12a.

The computing system may also include a storage unit, e.g., a hard disk drive 15 for reading from and writing to a hard disk, a magnetic disk drive 16 for reading from or writing to a magnetic disk, and an optical disk drive 17 for reading from or writing to an optical disk such as a CD-ROM or other optical media. The hard disk drive 15, the magnetic disk drive 16, and the optical disk drive 17 are connected to the system bus 10 by a hard disk drive interface 18, a magnetic disk drive-interface 19, and an optical drive interface 20, respectively.

Additionally, the computing system may further include an external memory 21 as the storage unit. The external memory 21 may be connected to the system bus 10 through an input/output interface 24.

The drives and their associated computer-readable media provide nonvolatile storage of computer-executable instructions, data structures, program modules, and other data for the computing system. Although the example environment described herein employs the hard disk 15, the magnetic disk 16 and the optical disk 17, other types of computer readable media for storing data can be used, including magnetic cassettes, flash memory cards, digital versatile disks, Bernoulli cartridges, RAMs, ROMs, and the like.

Program code means including one or more program modules, such as an operating system 13b, one or more application programs 13c, other program modules 13d, and program data 13e, may be stored on the hard disk 15, the magnetic disk 16, the optical disk 17, the ROM 12a, or the RAM 12b.

A user may enter commands and information into the computing system through other input device 22 such as a keyboard, a pointing device, a microphone, a joy stick, a game pad, or the like. This other input device 22 can be connected to the processing unit 11 through the input/output interface 24 coupled to the system bus 10. The input/output interface 24 may logically represent any of a wide variety of different interfaces, such as, for example, a serial port interface, a PS/2 interface, a parallel port interface, a universal serial bus (USB) interface, or an institute of electrical and electronics engineers (IEEE) 1394 interface (i.e., a FireWire interface), or may even logically represent a combination of different interfaces.

Additionally, the computing system may further include a display device 26 such as a monitor or LCD and/or an audio device 27 such as a speaker or a microphone, which are connected to the system bus 10 via a video/audio interface 25. The video/audio interface 25 may include high definition multimedia interface (HDMI), graphics device interface (GDI), or the like.

The computing system is connectable to networks, such as, for example, an office-wide or enterprise-wide computer network, a home network, an intranet, and/or the Internet. The computing system can exchange data with external sources, such as, for example, remote computer systems, remote applications, and/or remote databases over such networks.

The computing system includes a network interface 28, through which the computing system receives data from external sources and/or transmits data to external sources. The network interface 28 facilitates the exchange of data with remote devices. For example, if the computing system is the terminal device 300, the terminal device 300 may transmit or receive information to or from the content server 400 through the network interface 28. If the computing system is the content server 400, the content server 400 may transmit or receive information to or from the set-top box 200 and the terminal device 300 through the network interface 28. The network interface 28 can logically represent one or more software and/or hardware modules, such as, for example, a network interface card and corresponding network driver interface specification (NDIS) stack.

Likewise, the computing system receives and/or transmits data from and/or to external sources through the input/output interface 24. The input/output interface 24 is coupled to a modem 23 (e.g., a standard modem, a cable modem, or a digital subscriber line (DSL) modem), through which the computing system receives data from and/or transmits data to external sources.

While FIG. 25 represents a suitable operating environment for the present invention, the principles of the present invention may be employed in any system that is capable of, with suitable modification if necessary, implementing the principles of the present invention. The environment illustrated in FIG. 25 is illustrative only and by no means represents even a small portion of the wide variety of environments in which the principles of the present invention may be implemented.

Various kinds of information generated during the execution of a beacon-based payment service at the beacon service system of this invention may be stored and accessed from any of the computer-readable media associated with the computing system as shown in FIG. 17. For example, portions of such modules and portions of associated program data may be included in the operating system 13b, the application programs 13c, the program modules 13d and/or the program data 13e, for storage in the system memory 12.

When a mass storage device such as the hard disk is coupled to the computing system, such modules and associated program data may also be stored in the mass storage device. In a networked environment, program modules depicted relative to the computing system, or portions thereof, can be stored in a remote computer system connected through the modem 23 or network interface 25 of the input/output interface 24. Execution of such modules may be performed in a distributed environment as previously described.

While the specification contains many specific implementation details, these should not be construed as limitations on the scope of any disclosure or of what may be claimed, but rather as descriptions of features that may be specific to particular embodiments of particular disclosures. Certain features that are described in the specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Also, although the present specifications describe that operations are performed in a predetermined order with reference to a drawing, it should not be construed that the operations are required to be performed sequentially or in the predetermined order, which is illustrated to obtain a preferable result, or that all of the illustrated operations are required to be performed. In some cases, multi-tasking and parallel processing may be advantageous. Also, it should not be construed that the division of various system components are required in all types of implementation. It should be understood that the described program components and systems are generally integrated as a single software product or packaged into a multiple-software product.

While this disclosure has been particularly shown and described with reference to an exemplary embodiment thereof, it will be understood by those skilled in the art that various changes in form and details may be made therein without departing from the scope of this disclosure as defined by the appended claims.

The present invention has a good possibility of sales on the market or business and also has industrial applicability suitable for practical and apparent implementation.

What is claimed is:

1. A beacon service provision method implemented by a service management server, the method comprising:
  receiving schedule information from a terminal device;
  establishing a travel path to a destination of the terminal device based on the received schedule information;
  extracting at least one beacon device located on the established travel path;
  registering first beacon identification information of the at least one extracted beacon device;
  receiving, from the terminal device, second beacon identification information offered by a beacon device;
  comparing the second beacon identification information with the first beacon identification information; and
  if the second beacon identification information is not identical to first beacon identification information, resetting the established travel path and transmitting the reset travel path to the terminal device.

2. The method of claim 1, further comprising:
  checking a length of stay of the terminal device at a specific place corresponding to the second beacon identification information; and
  transmitting service content according to the length of stay to the terminal device.

3. The method of claim 1, further comprising identifying a current location of the terminal device; and
  calculating a direction and distance to store corresponding to the second beacon identification information from the identified current location.

4. The method of claim 1, wherein registering the first beacon identification information includes:
  checking predetermined event information corresponding to the at least one extracted beacon device;
  extracting one of first beacon devices based on the predetermined event information;
  determining whether there is at least one beacon device similar to the one of first beacon devices within a predetermined range from the one of the first beacon devices;
  if there is at least one beacon device similar to the one of the first beacon devices, selecting a second beacon device from among the at least one beacon device in view of predetermined event information corresponding to each of the at least one beacon device; and
  creating rescheduling information by resetting the travel path to pass the selected second beacon device.

5. The method of claim 4, wherein further comprising extracting first beacon device in view of user information of the terminal device when extracting the one of the first beacon devices based on the predetermined event information fails.

6. The method of claim 5, wherein the user information includes information about a payment method, a purchase history, favorites, or a customerpoint.

7. A service management server comprising: a communication module configured to transmit or receive data to or from a terminal device through a communication network; and a control module configured to:
  receive schedule information from a terminal device;
  establish a travel path to a destination of the terminal device based on the received schedule information;
  extract at least one beacon device located on the established travel path;
  register first beacon identification information of the extracted at least one beacon device;
  register first beacon identification information at a user's request;
  receiving, from the terminal device, second beacon identification information offered by a beacon device;
  comparing the second beacon identification information with the first beacon identification information; and
  if the second beacon identification information is not identical to with the first beacon identification information, reset the established travel path and transmit the reset travel path to the terminal device.

8. The service management server of claim 7, wherein the control module is further configured to determine, based on the second beacon identification information, whether there is a specific place corresponding to the extracted first beacon identification information within a predetermined range, and to calculate a direction and distance from the terminal device to the specific place corresponding to the extracted first beacon identification information.

* * * * *